US010051479B2

United States Patent
Goedken et al.

(10) Patent No.: US 10,051,479 B2
(45) Date of Patent: Aug. 14, 2018

(54) RADIO FREQUENCY SYSTEMS AND METHODS FOR OVERRIDING NETWORK SIGNALING VALUES

(71) Applicant: Apple Inc., Cupertino, CA (US)

(72) Inventors: Ryan J. Goedken, Santa Clara, CA (US); Xueting Liu, San Jose, CA (US); Nicholas W. Lum, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/680,049

(22) Filed: Aug. 17, 2017

(65) Prior Publication Data

US 2017/0347273 A1 Nov. 30, 2017

Related U.S. Application Data

(63) Continuation of application No. 14/816,971, filed on Aug. 3, 2015, now Pat. No. 9,749,871.

(51) Int. Cl.
| | |
|---|---|
| *H04B 1/40* | (2015.01) |
| *H04W 16/14* | (2009.01) |
| *H04W 24/02* | (2009.01) |
| *H04W 52/36* | (2009.01) |
| *H04W 52/52* | (2009.01) |
| *H04W 52/24* | (2009.01) |
| *H04W 52/22* | (2009.01) |
| *H04W 52/28* | (2009.01) |

(52) U.S. Cl.
CPC ........... *H04W 16/14* (2013.01); *H04W 24/02* (2013.01); *H04W 52/243* (2013.01); *H04W 52/367* (2013.01); *H04W 52/52* (2013.01); *H04W 52/225* (2013.01); *H04W 52/283* (2013.01)

(58) Field of Classification Search
CPC .... H04W 16/14; H04W 24/02; H04W 52/243
USPC .......................................................... 455/77
See application file for complete search history.

(56) References Cited

U.S. PATENT DOCUMENTS

| | | |
|---|---|---|
| 7,787,562 B2 | 8/2010 | Netsell et al. |
| 2014/0036667 A1 | 2/2014 | Balasubramanian et al. |
| 2014/0071905 A1 | 3/2014 | Nimmala et al. |

(Continued)

FOREIGN PATENT DOCUMENTS

WO 2014-041480 A2 3/2014

*Primary Examiner* — Ayodeji Ayotunde
(74) *Attorney, Agent, or Firm* — Fletcher Yoder PC

(57) ABSTRACT

Systems and method to improve performance of a radio frequency system while operating in compliance with wireless transmission regulations are provided. One embodiment describes a radio frequency system including an antenna that wirelessly transmits an analog electrical signal at a transmission frequency and receives a first network signaling value from a wireless network. The radio frequency system further includes a controller that determines operational constraints on the radio frequency system based on a region of operation; determines a second network signaling value based on the operational constraints, in which the second network signaling value overrides the first network signaling value; determines operational parameters based on the second network signaling value; and instructs the radio frequency system to implement the operational parameters to facilitate the radio frequency system operating in compliance with the operational constraints.

20 Claims, 14 Drawing Sheets

(56) References Cited

U.S. PATENT DOCUMENTS

| | | | |
|---|---|---|---|
| 2014/0140290 A1* | 5/2014 | Bergljung | H04W 8/24 |
| | | | 370/329 |
| 2015/0087352 A1 | 3/2015 | Lim et al. | |
| 2015/0094078 A1* | 4/2015 | Cheadle | H04W 52/146 |
| | | | 455/452.1 |
| 2015/0111608 A1 | 4/2015 | Kazmi et al. | |
| 2015/0289215 A1 | 10/2015 | Kaukovuori et al. | |

\* cited by examiner

OUTPUT POWER REDUCTION LUT – INS_04

| CHANNEL BANDWIDTH | STARTING RB | NUMBER OF RBS | OUTPUT POWER REDUCTION VALUE |
|---|---|---|---|
| 10 MHZ | 0-12 | ANY | 3 dBm |
| 10 MHZ | 13-36 | >37 | 2 dBm |
| 10 MHZ | 37-40 | ANY | 3 dBm |
| 20 MHZ | 0-24 | ANY | 3 dBm |
| 20 MHZ | 25-74 | >75 | 2 dBm |
| 20 MHZ | 75-99 | ANY | 3 dBm |
| ⋮ | | | |

NETWORK SIGNALING VALUE OVERRIDE LUT – BAND 41

| | CHANNEL FREQUENCY | TRANSMISSION FREQUENCY | OVERRIDE NS+XX | OVERRIDE ENABLE/DISABLE |
|---|---|---|---|---|
| 138 | 2510.5-2530.5 MHZ | 2510.5-2530.5 MHZ | NS_04 | ENABLE |
| 140 | 2530.5-2550.5 MHZ | 2530.5-2550.5 MHZ | N/A | DISABLE |
| 142 | 2510.5-2530.5 MHZ | 2510.5-2520.5 MHZ | NS_04 | DISABLE |
| 144 | 2510.5-2520.5 MHZ | 2510.5-2520.5 MHZ | N/A | DISABLE |
| 146 | 2510.5-2520.7 MHZ | 2510.5-2510.7 MHZ | NS_04 | DISABLE |
| 148 | 2515.5-2525.7 MHZ | 2515.5-2515.7 MHZ | N/A | DISABLE |
| | ⋮ | | | |

PA OPERATIONAL PARAMETER LUT 62

| OUTPUT POWER REDUCTION | PROXIMITY OF PROTECTED | RGI | PA V$_{cc}$ | DPD COEF. | DETROUGH FUNCTION | TRACKING |
|---|---|---|---|---|---|---|
| 3 dBm | 40 MHZ | RGI$_1$ | V$_{cc1}$ | AMAM$_1$/AMPM$_1$ | DF$_1$ | ENVELOPE |
| 3 dBm | 4 MHZ | RGI$_2$ | V$_{cc2}$ | AMAM$_2$/AMPM$_2$ | N/A | AVERAGE POWER |
| 6 dBm | 40 MHZ | RGI$_3$ | V$_{cc3}$ | AMAM$_3$/AMPM$_3$ | DF$_2$ | ENVELOPE |
| 7 dBm | 40 MHZ | RGI$_4$ | V$_{cc4}$ | AMAM$_4$/AMPM$_4$ | N/A | AVERAGE POWER |
| ... | | | | | | |

RADIO FREQUENCY SYSTEMS AND METHODS FOR OVERRIDING NETWORK SIGNALING VALUES

CROSS-REFERENCE TO RELATED APPLICATIONS

Under 35 U.S.C. § 120, this application is a continuation of U.S. patent application Ser. No. 14/816,971 filed on Aug. 3, 2015, which is incorporated by reference herein in its entirety for all purposes.

BACKGROUND

The present disclosure relates generally to radio frequency systems and, more particularly, to controlling spurious emissions produced by a radio frequency system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices may include a radio frequency system to facilitate wireless communication of data with other electronic devices and/or a network. The radio frequency system may include a transceiver that receives a digital representation of data as a digital electrical signal and generates an analog representation of the data as an analog electrical signal. A power amplifier may then amplify the analog electrical signal to a desired output power for wireless transmittance via an antenna at a desired radio frequency, such as one or more assigned resource blocks within a channel. As used herein, a "channel" is intended to describe a range of frequencies and a "resource block" is intended to describe a smallest assignable range of frequencies within the channel.

To facilitate operating in varying regions (e.g. countries, jurisdictions, geographies), the radio frequency may be designed to be capable of transmitting at multiple different frequencies. However, different regions may have different regulatory bodies, which set wireless transmission regulations for that region. For example, the Federal Communications Commission (FCC) sets wireless transmission regulations for the United States, the Industry Canada (IC) sets wireless transmission regulations for Canada, the Ministry of Internal Affairs and Communications (MIC) sets wireless transmission regulations for Japan, and the European Telecommunications Standards Institute (ETSI) sets wireless transmission regulations for Europe. As such, the wireless transmission regulations may vary in different regions.

To facilitate compliance with wireless transmission regulations in a region, a wireless service provider may transmit a network signaling value (NS_XX or CA_NS_XX). Based on the network signaling value, the radio frequency system may adjust operation to be in compliance with the wireless transmission regulations. Thus, compliance with the wireless transmission regulations may be reliant on receiving the correct network signaling value from the wireless service provider. In other words, if the correct network signaling value is not received, the radio frequency system may operate out of compliance with the wireless transmissions regulations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving performance of a radio frequency system while operating in compliance with wireless transmission regulations. Generally, the radio frequency system may wirelessly communicate data with other electronic devices and/or a network by modulating radio waves at an assigned transmission frequency (e.g., one or more resource blocks) based on an analog representation of the data (e.g., an analog electrical signal). However, the analog electrical signal may contain noise introduced by the components in the radio frequency system that causes the radio frequency system to transmit spurious emissions at frequencies other than the transmission frequency.

However, regulatory bodies generally set wireless transmission regulations that govern acceptable amount of spurious emissions transmitted, particularly at protected or restricted frequencies, by radio frequency systems operating within their regions (e.g., jurisdictions). To facilitate compliance, a wireless service provider may transmit a network signaling value to a radio frequency system connected to its network. Based on the received network signaling value, the radio frequency system may adjust operational parameters to be in compliance with the wireless transmission regulations. Thus, in such embodiments, compliance with the wireless transmission regulations may be premised on the radio frequency system receiving the correct network signaling value.

However, in some instances, the radio frequency system may not receive the correct network signaling value, thereby causing the radio frequency system to operate out of compliance with the wireless transmission regulations. As such, regulatory bodies may require that radio frequency systems operate in compliance with wireless transmission regulations regardless of network signaling values received.

Since radio frequency systems may be designed to operate in different regions with varying wireless transmission regulations, this may cause the radio frequency system to unduly adjust operational parameters even when the radio frequency system may otherwise already be in compliance. In some embodiments, adjusting the operational parameters may affect performance of the radio frequency system. In other words, adjusting operational parameters when the radio frequency system is already in compliance may unnecessarily impact performance of the radio frequency system.

Accordingly, to improve operation, a radio frequency system may dynamically adjust operational parameters to be in compliance with wireless transmission regulations even when the correct network signaling value is not received. For example, in some embodiments, the radio frequency system may determine the region (e.g., country) it is operating in. Based on the region, the radio frequency system may then determine protected frequencies within that region, and/or spurious emission limits for those protected frequencies. In this manner, the radio frequency system may determine the operational constraints (e.g., wireless transmission regulations) even when a correct network signaling value is not received.

Based on the operational constraints, the radio frequency system may then determine operational parameters to implement. More specifically, the radio frequency system may determine whether operating based on a network signaling value, which may be received from a wireless service provider, is expected to be in compliance with the operational constraints. In some embodiments, the radio frequency system may whether expected to operate in compliance based on the protected frequencies, spurious emission limits, transmission frequency, channel frequency, channel bandwidth, location of the transmission frequencies in the channel frequencies, and the like.

When not expected to be in compliance, the radio frequency system may determine an override network signaling value and operate based on the override network signaling value instead of the received network signaling value. More specifically, based at least in part on the override network signaling value, the radio frequency system may determine operational parameters that facilitate operating in compliance with the operational constraints (e.g., wireless transmission regulations). In some embodiments, the operational parameters may include an output power reduction value, power amplifier operational parameters, filtering operational parameters, carrier aggregation operational parameters, and/or channel configuration operational parameters.

For example, the radio frequency system may determine the output power reduction value based at least in part on the override network signaling value, the channel bandwidth, a starting assigned resource block, and/or number of assigned resource block. In some embodiments, the radio frequency system may then implement the output power reduction value to reduce output power and, thus, magnitude of spurious emissions. Additionally or alternatively, the radio frequency system may determine other operational parameters based at least in part on the output power reduction value.

For example, the radio frequency system may determine power amplifier operational parameters based at least in part on the output power reduction value and/or proximity to protected frequencies. The radio frequency system may then implement the power amplifier operational parameters to increase linearity of a power amplifier and, thus, magnitude of spurious emissions. Additionally, the radio frequency system determine filtering operational parameters based at least in part on the output power reduction value and/or location of protected frequencies. The radio frequency system may then implement the filtering operational parameters to reduce magnitude of spurious emissions at the protected frequencies.

Moreover, the radio frequency system may determine carrier aggregation operational parameters and/or channel configuration operational parameters based at least in part on the location of protected frequencies. The radio frequency system may then implement the carrier aggregation operational parameters and/or channel configuration operational parameters to control transmission frequency and, thus, magnitude and/or location of spurious emissions. In this manner, the radio frequency system may operate in compliance with wireless transmission regulations even when a correct network signaling value is not received.

BRIEF DESCRIPTION OF THE DRAWINGS

Various aspects of this disclosure may be better understood upon reading the following detailed description and upon reference to the drawings in which:

FIG. 14 is an example of a power amplifier operational parameter look-up-table, in accordance with an embodiment;

DETAILED DESCRIPTION

Figure 1:
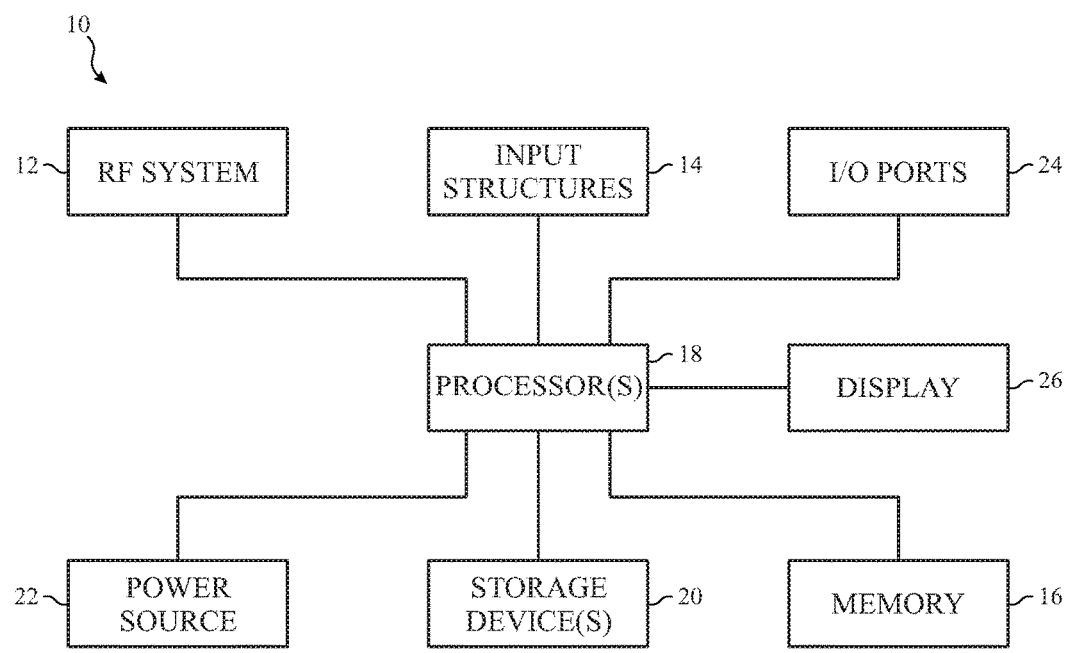
FIG. 1 is a block diagram of a electronic device with a radio frequency system, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may include a radio frequency system to facilitate wirelessly communication of data with another electronic device and/or a network. More specifically, the radio frequency system may modulate radio waves at a transmission frequency, such as an assigned one or more resource blocks in a channel, to enable the electronic device to communicate via a personal area network (e.g., Bluetooth network), a local area network (e.g., an 802.11x Wi-Fi network), and/or a wide area network (e.g., a 4G or LTE cellular network). In other words, the radio frequency systems may utilize various wireless communication protocols to facilitate communication of data.

Nevertheless, radio frequency systems may generally be operationally similar regardless of the wireless communication protocol used. For example, to transmit data, processing circuitry may generate a digital representation of the data as a digital electrical signal and a transceiver (e.g., a transmitter and/or a receiver) may then convert the digital electrical signal into one or more analog electrical signals. The analog electrical signal may then be amplified by a power amplifier, filtered by one or more filters, and transmitted by an antenna.

However, along with the data, the radio frequency system may also transmit spurious emissions. As used herein, "spurious emissions" are intended to describe wireless signals transmitted at frequencies other than the assigned transmission frequency. In some embodiments, the spurious emissions may be the result of noise introduced into the analog electrical signal by the transceiver and/or the power amplifier. For example, the transceiver may introduce noise as a result of digital signal modulation or analog impairments in its modulator, mixer, or driver amplifier. Additionally, the power amplifier may introduce noise as a result of non-linearities.

In some instances, spurious emissions may leak into frequencies surrounding the transmission frequency. For example, when a radio frequency system is assigned fifty resource blocks (e.g., 10 MHz) in a channel between 2500.5-2510.5 MHz, the radio frequency system may generate spurious emissions between 2490.5-2500.5 MHz and between 2510.5-2520.5 MHz due to third order intermodulation products. Additionally, the radio frequency system may generate spurious emissions between 2480.5-2490.5 MHz and between 2520.5-2530.5 MHz due to fifth order intermodulation products, and so on with higher odd order intermodulation products.

Additionally, spurious emissions may occur at harmonics of the transmission frequency. For example, continuing with the above example, the radio frequency system may generate spurious emissions between 5001-5021 MHz due to a second harmonic. Additionally, the radio frequency system may generate spurious emissions between 7501.5-7531.5 MHz due to a third harmonic, and so on with higher harmonics.

However, regulatory bodies may set allowable spurious emissions limits for radio frequency systems operating in their regions (e.g., jurisdictions). More specifically, some regulatory bodies may restrict radio frequency systems from transmitting spurious emissions above a specified limit at restricted or protected frequencies. For example, the FCC mandates that spurious emissions transmitted in the United States should be less than −13 dBm at frequencies between 2490.5-2496 MHz and should be less than −25 dBm at frequencies less than 2490.5 MHz.

In fact, a regulatory body may authorize only radio systems that comply with its wireless transmission regulations to operate in its region. As such, a radio frequency system should operate such that spurious emissions are lower than the set limits. For example, when operating in the United States, the radio frequency system transmitting at 2500-2210 MHz should operate such that the third order intermodulation products (e.g., between 2490.5-2500.5) are less than −13 dBm and the fifth order intermodulation products (e.g., between 2480.5 and 2490.5) are less than −25 dBm.

To facilitate compliance, a wireless service provider may transmit a network signaling value (NS_XX) to radio frequency systems connected to its network. In this manner, the radio frequency system may determine wireless transmission regulations governing the region it is operating in. Based on the received network signaling value, the radio frequency system may adjust operational parameters to be in compliance with the wireless transmission regulations.

Thus, in such embodiments, compliance with the wireless transmission regulations may be premised on the radio frequency system receiving the correct network signaling value. However, in some instances, the radio frequency system may fail to receive the network signaling value, for example, if the wireless service provider inadvertently turns off transmission of the network signaling value or transmits an incorrect network signaling value. In such instances, the radio frequency system may operate out of compliance with the wireless transmission regulations.

Thus, some regulatory bodies may require that a radio frequency system operates in compliance with wireless transmission regulations regardless of network signaling values received from the wireless service provider. However, since the radio frequency system may be designed to operate in different regions with varying wireless transmission regulations, this may cause the radio frequency system to unduly adjust operational parameters even when the radio frequency system may otherwise already be in compliance.

In some embodiments, adjusting the operational parameters may affect performance of the radio frequency system. For example, reducing output power of the radio frequency system may reduce distance the radio frequency system is able to communicate and/or integrity of received wireless signals. Additionally, increasing linearity of a power amplifier in the radio frequency system may increase power consumption of the radio frequency system. In other words, adjusting operational parameters when the radio frequency system is already in compliance may unnecessarily impact performance of the radio frequency system.

Accordingly, as will be described in more detail below, the present disclosure provides techniques to facilitate compliance with wireless transmission regulations without unnecessarily adjusting operational parameters. In some embodiments, a radio frequency system may determine operational constraints (e.g., wireless transmission regulations) irrespective of a network signaling value received. For example, the radio frequency system may determine the country (e.g., region) it is operating in and determine protected frequency bands and spurious emission limits for that country. In this manner, the radio frequency system may determine the wireless transmission regulations even when a correct network signaling value is not received.

Based at least in part on the operational constraints, the radio frequency system may determine operational parameters to implement. For example, the radio frequency system may determine whether transmitting an analog electrical signal is expected to produce spurious emissions in protected frequencies that meet the spurious emission limits based on its transmission frequency and channel frequency. In some embodiments, the radio frequency system may determine an override network signaling value to indicate that spurious emissions are not expected to meet limits.

As such, when the override network signaling value is determined, the radio frequency system may adjust operational parameters to facilitate compliance with the operational constraints (e.g., spurious emission limits). For example, in some embodiments, the radio frequency system may then use the override network signaling value to override a network signaling value received from the wireless service provider. In such embodiments, the radio frequency system may determine an output power reduction value associated with the override network signaling value. Based on the output power reduction value, the radio frequency system may then reduce its output power and, thus, magnitude of spurious emissions.

Additionally or alternatively, the radio frequency system may utilize the override network signaling value and/or the output power reduction value to determine other operational parameters. For example, based on the output power reduction value and/or location of protected frequencies, the radio frequency system may determine power amplifier operational parameters (e.g., radio frequency gain index, power amplifier supply voltage, digital predistortion coefficients, envelope tracking detrough function or shaping table, and/or tracking mode) and/or filtering operational parameters (e.g., enable/disable filter, filter rejection, and/or target frequencies) to reduce magnitude of spurious emissions at the protected frequencies. Additionally, based on location of the protected frequencies, the radio frequency system may determine carrier aggregation operational parameters (e.g., enable/disable carrier aggregation and/or transmission frequency when disabled) and/or channel configuration operational parameters (e.g., channel bandwidth restrictions and/or output power restrictions) to adjust magnitude and/or location of spurious emissions.

The radio frequency system may then implement any combination of the operational parameters (e.g., a set of operational parameters) to facilitate operating in compliance with the operational constraints (e.g., wireless transmissions regulations). In fact, since the radio frequency system may operate based on the override network signaling value instead of the received network signaling value, the radio frequency system may operate in compliance even when the correct network signaling value is not received. More specifically, the radio frequency system may determine operational constraints (e.g., wireless transmission regulations) irrespective of the received network signaling value and determine an override network signaling value based on the operational constraints. Based at least in part on the override network signaling value, the radio frequency system may then dynamically adjust its operational parameters. In this manner, unnecessary operational parameter adjustments may be obviated, thereby improving performance of the radio frequency system.

To help illustrate, an electronic device 10 that may utilize a radio frequency system 12 is described in FIG. 1. As will be described in more detail below, the electronic device 10 may be any suitable electronic device, such as a handheld computing device, a tablet computing device, a notebook computer, and the like. As depicted, the electronic device 10 includes the radio frequency system 12, input structures 14, memory 16, one or more processor(s) 18, one or more storage devices 20, a power source 22, input/output ports 24, and an electronic display 26. The various components described in FIG. 1 may include hardware elements (including circuitry), software elements (including instructions stored on a non-transitory computer-readable medium), or a combination of both hardware and software elements.

It should be noted that FIG. 1 is merely one example of a particular implementation and is intended to illustrate the types of components that may be present in the electronic device 10. Additionally, it should be noted that the various depicted components may be combined into fewer components or separated into additional components. For example, the memory 16 and a storage device 20 may be included in a single component.

As depicted, the processor 18 is operably coupled with memory 16 and the storage device 20. More specifically, the processor 18 may execute instruction stored in memory 16 and/or the storage device 20 to perform operations in the electronic device 10, such as instructing the radio frequency system 12 to communicate with another device. As such, the processor 18 may include one or more general purpose microprocessors, one or more application specific processors (ASICs), one or more field programmable logic arrays (FPGAs), or any combination thereof. Additionally, memory 16 and/or the storage device 20 may be a tangible, non-transitory, computer-readable medium that stores instructions executable by and data to be processed by the processor 18. For example, the memory 16 may include random access memory (RAM) and the storage device 20 may include read only memory (ROM), rewritable flash memory, hard drives, optical discs, and the like.

Additionally, as depicted, the processor 18 is operably coupled to the power source 22, which provides power to the various components in the electronic device 10. As such, the power source 22 may includes any suitable source of energy, such as a rechargeable lithium polymer (Li-poly) battery and/or an alternating current (AC) power converter. Furthermore, as depicted, the processor 18 is operably coupled with I/O ports 24, which may enable the electronic device 10 to interface with various other electronic devices, and input structures 14, which may enable a user to interact with the electronic device 10. Accordingly, the inputs structures 14 may include buttons, keyboards, mice, trackpads, and the like. Additionally, in some embodiments, the electronic display 26 may include touch sensitive components.

In addition to enabling user inputs, the electronic display 26 may display image frames, such as a graphical user interface (GUI) for an operating system, an application interface, a still image, or video content. As depicted, the electronic display 26 is operably coupled to the processor 18. Accordingly, the image frames displayed by the electronic display 26 may be based on display image data received from the processor 18.

As depicted, the processor 18 is also operably coupled with the radio frequency system 12, which may facilitate communicatively coupling the electronic device 10 to one or more other electronic devices and/or networks. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network.

As can be appreciated, the radio frequency system 12 may enable communication using various communication protocols. However, operational principles of the radio frequency system 12 may be similar for each of the communication protocols (e.g., Bluetooth, LTE, 802.11x Wi-Fi, etc). For example, regardless of communication protocol, the radio frequency system 12 generally converts a digital electrical signal containing data desired to be transmitted into an analog electrical signal using a transceiver. The analog electrical signal may then be amplified using a power amplifier, filtered using a filter, and transmitted using an antenna. In other words, the techniques described herein may be applicable to any suitable radio frequency system 12 that operates in any suitable manner regardless of communication protocol used.

Figure 2:
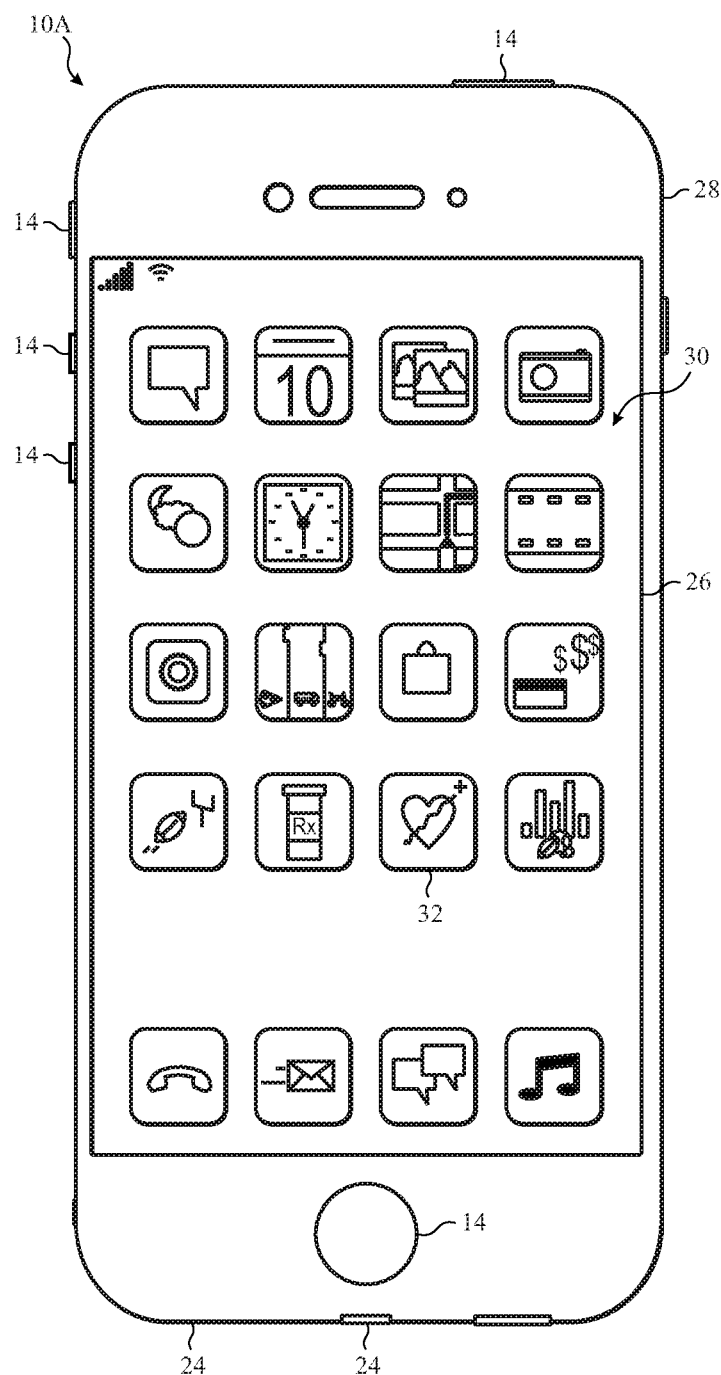
FIG. 2 is an example of the electronic device of FIG. 1, in accordance with an embodiment.

As described above, the electronic device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and to shield them from electromagnetic interference. The enclosure 28 may surround the electronic display 26, which, in the depicted embodiment, displays a graphical user interface (GUI) 30 having an array of icons 32. By way of example, when an icon 32 is selected either by an input structure 14 or a touch sensing component of the electronic display 26, an application program may launch.

Additionally, as depicted, input structures 14 may open through the enclosure 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 24 open through the enclosure 28. In some embodiments, the I/O ports 24 may include, for example, an audio jack to connect to external devices. Additionally, the radio frequency system 12 may also be enclosed within the enclosure 28 and internal to the handheld device 10A.

Figure 3:
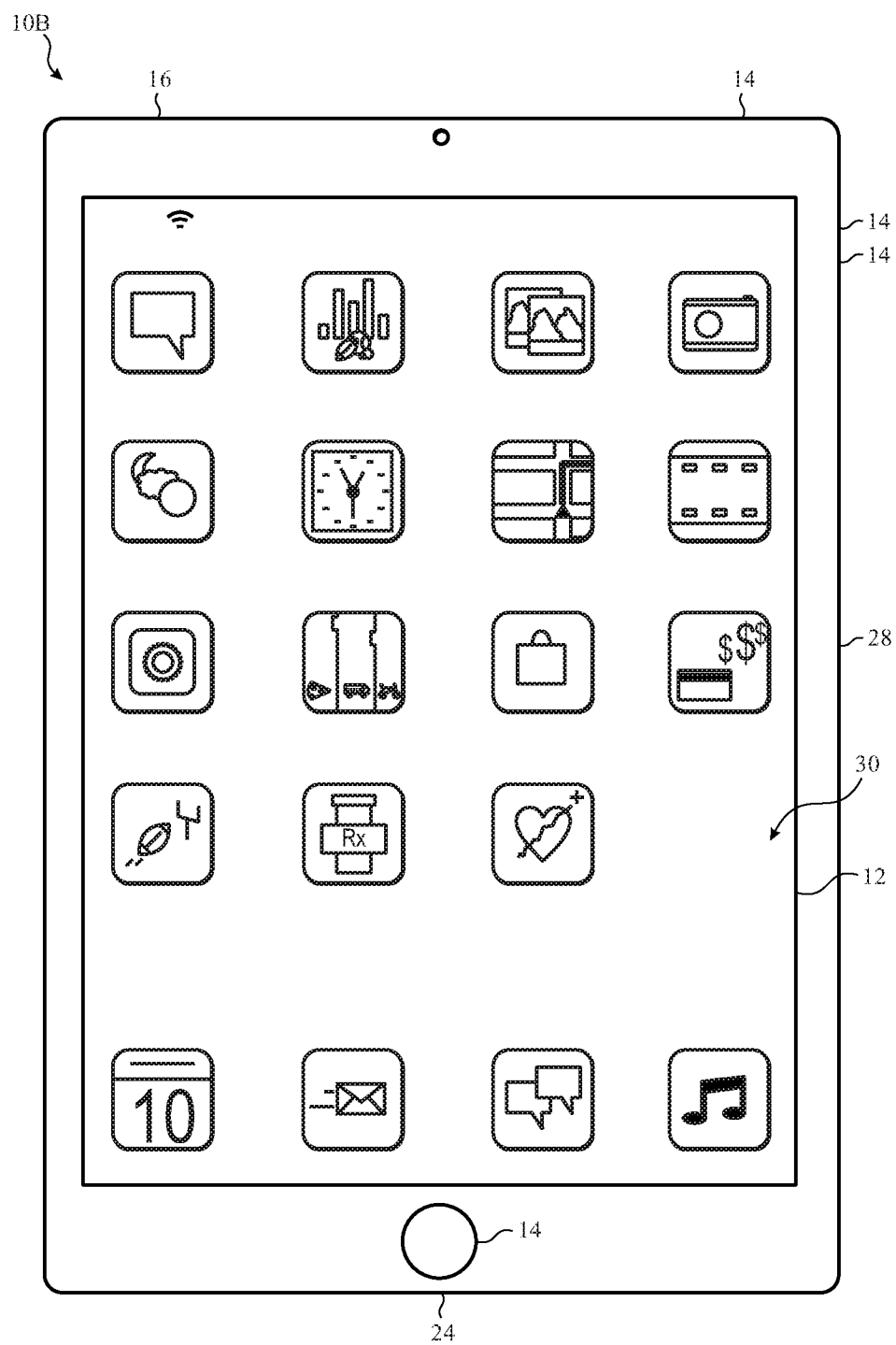
FIG. 3 is an example of the electronic device of FIG. 1, in accordance with an embodiment.
Figure 4:
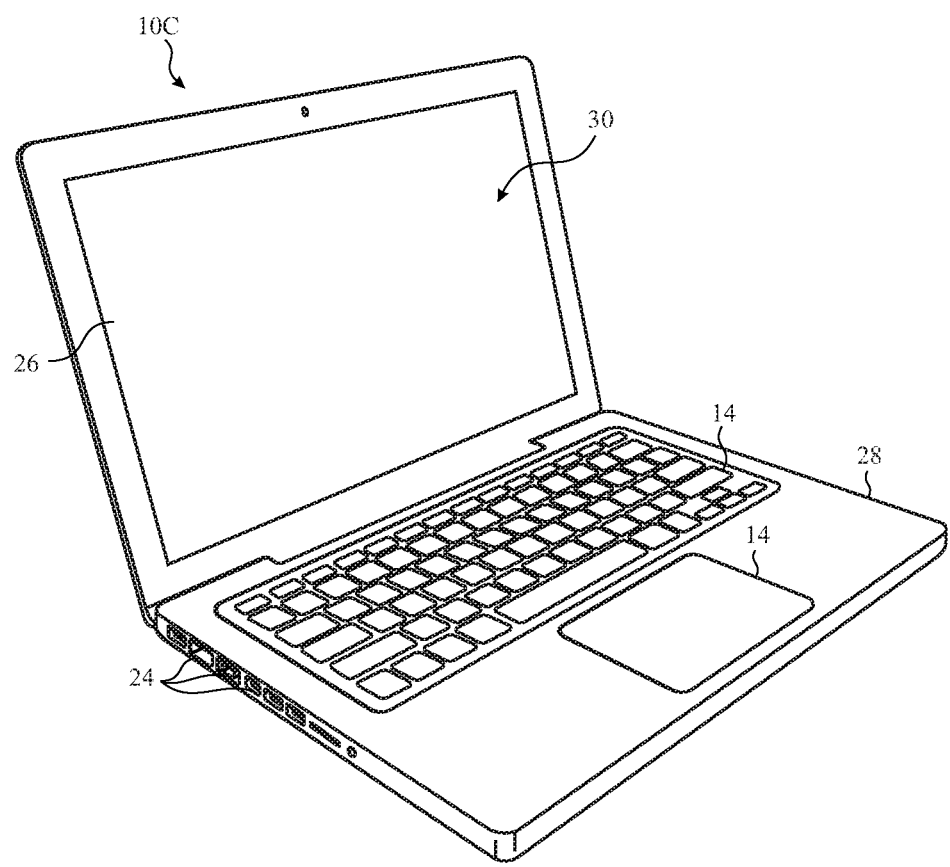
FIG. 4 is an example of the electronic device of FIG. 1, in accordance with an embodiment.

To further illustrate a suitable electronic device 10, a tablet device 10B is described in FIG. 3, such as any iPad® model available from Apple Inc. Additionally, in other embodiments, the electronic device 10 may take the form of a computer 10C as described in FIG. 4, such as any Macbook® or iMac® model available from Apple Inc. As depicted, the tablet device 10B and the computer 10C also each includes an electronic display 26, input structures 14, I/O ports 24, and an enclosure 28. Similar to the handheld device 10A, the radio frequency system 12 may also be enclosed within the enclosure 28 and internal to the tablet device 10B and/or the computer 10C.

Figure 5:
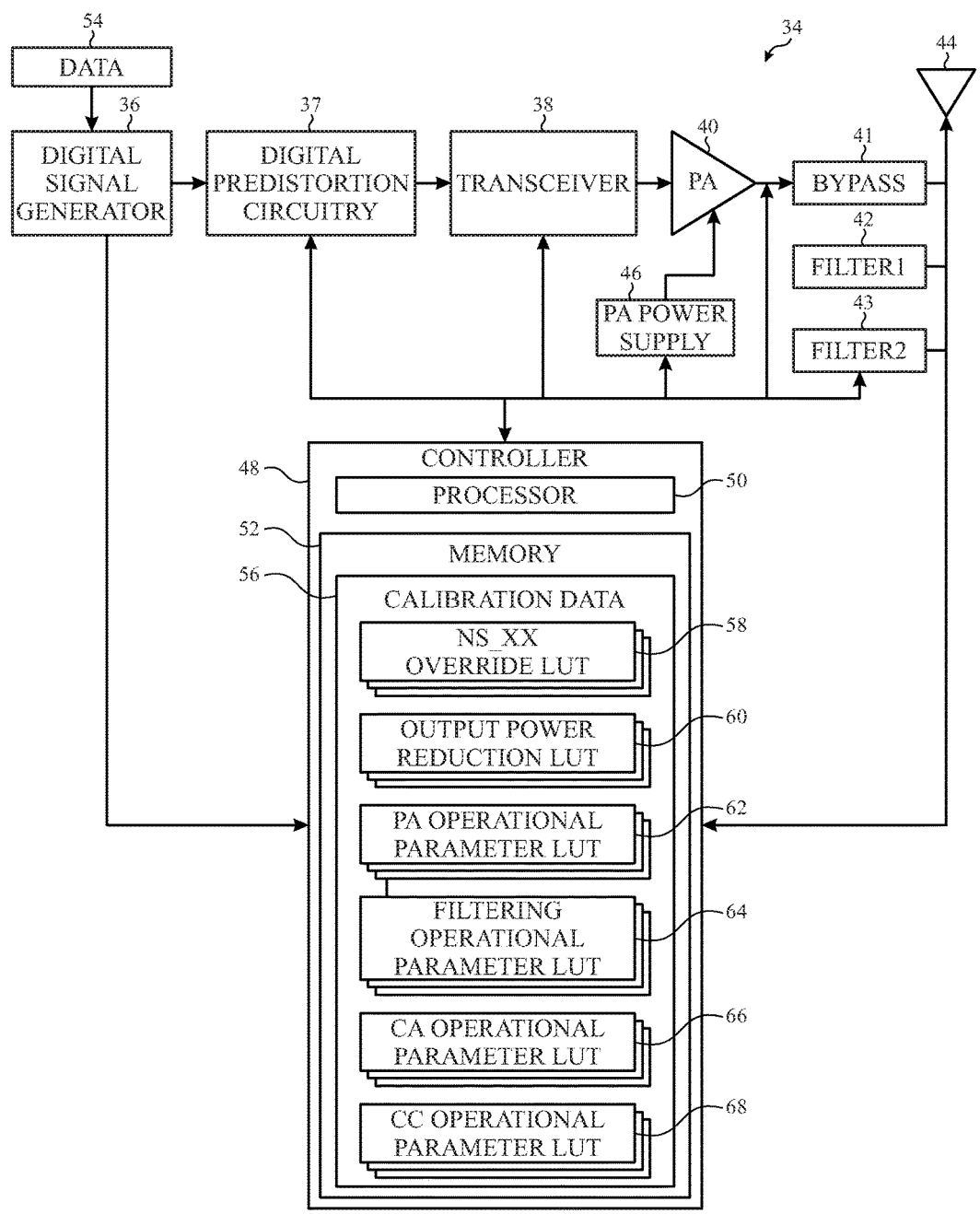
FIG. 5 is block diagram of a portion of the radio frequency system of FIG. 1, in accordance with an embodiment.

As described above, the radio frequency system 12 may facilitate communication with other electronic devices and/or a network by wirelessly communicating data. To help illustrate, a portion 34 of radio frequency system 12 is described in FIG. 5. As depicted, the portion 34 includes a digital signal generator 36, digital predistortion circuitry 37, a transceiver 38, a power amplifier 40, a filter bypass 41, a first filter 42, a second filter 43, an antenna 44, a power amplifier power supply 46, and a controller 48

In the depicted embodiment, the controller 48 may control operation of the radio frequency system 12. To facilitate controlling operation, the controller 48 may include a controller processor 50 and controller memory 52. In some embodiments, the controller 48 may instruct the radio frequency system 12 to implement determined operational parameters based at least in part on calibration data 56. Accordingly, in some embodiments, the controller processor 50 may be included in the processor 18 and/or separate processing circuitry and the controller memory 52 may be included in memory 16 and/or a separate tangible non-transitory computer-readable medium.

More specifically, the calibration data 56 may describe operational parameters that may be implemented so that the radio frequency system 12 operates in compliance with wireless transmission regulations. For example, in the depicted embodiment, the calibration data 56 includes one or more network signaling (NS_XX) override look-up-tables (LUTs) 58, one or more output power reduction LUTs 60, one or more power amplifier (PA) operational parameter LUTs 62, one or more filtering operation parameter LUTs 64, one or more carrier aggregation (CA) operational parameter LUTs 66, and/or one or more channel configuration operational parameter LUTs 68. As will be described in more detail below, the calibration data 56 may enable the radio frequency system 12 to determine an output power reduction value, power amplifier operational parameters, filtering operational parameters, channel configuration operational parameters, and/or carrier aggregation operational parameters that may be implemented to facilitate operating in compliance with wireless transmission regulations.

Additionally, the digital signal generator 36 may generate a digital representation of data 54 desired to be transmitted from the electronic device 10 by outputting a digital electrical signal. In some embodiments, the digital signal generator 36 may be included in the processor 18 and/or separate processing circuitry, such as a baseband processor or a modem in the radio frequency system 12.

The digital predistortion circuitry 37 may then receive the digital electrical signal from the digital signal generator 36. Generally, the digital predistortion circuitry 37 may apply digital predistortion to the digital electrical signal to mitigate (e.g., cancel) noise introduced by the radio frequency system 12 (e.g., the transceiver 38 and/or the power amplifier 40). For example, the digital predistortion circuitry 37 may perform gain expansion on the digital electrical signal to compensate for compression in the power amplifier 40.

In some embodiments, the digital predistortion circuitry 37 may apply digital distortion based at least in part on an amplitude modulation (AMAM) predistortion coefficient and/or a phase modulation (AMPM) predistortion coefficient. In some embodiments, the controller 48 may determine the predistortion coefficients using the one or more power amplifier operational parameter LUTs 62 and communicate the predistortion coefficients to the digital predistortion circuitry 37. In this manner, the digital predistortion circuitry 37 may implement operational parameters (e.g., predistortion coefficients) to facilitate the radio frequency system 12 operating in compliance with wireless transmission regulations.

Subsequently, the transceiver 38 may receive the digital electrical signal and generate an analog representation of the data 54. For example, the transceiver 38 may generate an analog representation by outputting an amplitude signal to indicate a desired output power and an analog electrical signal to indicate phase (e.g., whether high or low) of the digital electrical signal. In some embodiments, the controller 48 may instruct the transceiver 38 to generate the analog electrical signal using a radio frequency gain index (RGI) determined using the one or more power amplifier operational parameter LUTs 62. In this manner, the digital pre-distortion circuitry 37 may implement operation parameters (e.g., radio frequency gain index) to facilitate the radio frequency system 12 operating in compliance with wireless transmission regulations.

Since the output power of the analog electrical signal may be small, the power amplifier 40 may receive and amplify the analog electrical signal by outputting an amplified analog electrical signal. More specifically the power amplifier 40 may selectively connect its output to a power amplifier supply voltage based on the magnitude of the analog electrical signal. As such, the output power of the amplified electrical signal may be based at least in part on the power amplifier supply voltage received from the power amplifier power supply 46.

In some embodiments, the controller 48 may instruct the power amplifier power supply 46 to generate the power amplifier supply voltage based at least in part on an output power reduction value determined using the one or more output power reduction LUTs 60. Additionally or alternatively, the controller 48 may instruct the power amplifier power supply 46 to generate the power amplifier supply voltage based on a target power amplifier supply voltage ($V_{cc}$) determined using the one or more power amplifier operational parameter LUTs 62. In this manner, the power amplifier power supply 46 may implement operation parameters (e.g., output power reduction value and/or target power amplifier supply voltage) to facilitate the radio frequency system 12 operating in compliance with wireless transmission regulations.

As described above, the radio frequency system 12 (e.g., transceiver 38 and/or power amplifier 40) may introduce noise into the amplified analog electrical signal. As such, the controller 48 may instruct the radio frequency system 12 to adjust filtering applied to the amplified analog electrical signal based on operational constraints. For example, in the depicted embodiment, the controller 48 may instruct the radio frequency system 12 to connect to (e.g., enable) the filter bypass 41, thereby bypassing filtering on the amplified analog electrical signal.

To filter the amplified analog electrical signal, the controller 48 may instruct the radio frequency system 12 to connect to (e.g., enable) a filter. In some embodiments, the radio frequency system 12 may include multiple filters with different operational parameters (e.g., filter rejection and/or target frequencies). For example, in the depicted embodiment, the controller 48 may instruct the radio frequency system 12 to connect to either the first filter 42 or second filter 43 based on desired filtering operational parameters. Additionally or alternatively, the controller 48 may instruct the radio frequency system 12 to connect to the first filter 42 and instruct the first filter 42 to adjust its operational parameters.

In some embodiments, the controller 48 may instruct the radio frequency system 12 to enable the filter bypass 41, the first filter 42, or the second filter 43 based at least in part on the one or more filtering operational parameter LUTs 64.

Additionally, in some embodiments, the controller 48 may instruct the first filter 42 to adjust target frequency and/or filter rejection determined using the one or more filtering operational parameter LUTs 64. In this manner, the radio frequency system 12 may implement operation parameters (e.g., enable/disable of filters, target frequencies, and/or filter rejection) to facilitate the radio frequency system 12 operating in compliance with wireless transmission regulations.

The analog electrical signal may then be wirelessly transmitted to another electronic devices and/or a network via the antenna 44 as modulated radio waves. In some embodiments, the controller 48 may instruct the antenna 44 regarding the transmission frequency and/or the transmission bandwidth to use for transmission. For example, the antenna 44 may enable carrier aggregation to increase transmission bandwidth. As such, the controller 48 may instruct the antenna 44 to enable/disable carrier aggregation and/or transmission frequency to use when carrier aggregation is disabled based at least in part on the one or more carrier aggregation operational parameter LUTs 66. Additionally, the controller 48 may instruct the antenna 44 to restrict channel bandwidth and/or output power in edge frequencies based at least in part on channel configuration operational parameters determined using the one or more channel configuration operational parameter LUTs 68. In this manner, the antenna 44 may implement operation parameters (e.g., enable/disable carrier aggregation, transmission frequency to use, channel bandwidth restriction and/or output power restriction) to facilitate the radio frequency system 12 operating in compliance with wireless transmission regulations.

As described above, noise or distortion introduced by the radio frequency system 12 may result in spurious emissions at frequencies other than the desired transmission frequency. To help illustrate, FIGS. 6 and 7 describe examples of analog electrical signals transmitted by the radio frequency system 12. More specifically, FIG. 6 describes a first analog electrical signal 70 that is transmitted when the radio frequency system 12 is assigned fifty resource blocks and FIG. 7 describes a second electrical signal 72 that is transmitted when the radio frequency system 12 is assigned one resource block. In the depicted embodiments, the radio frequencies are divided into channels with bandwidths of 10 MHz. As such, FIGS. 6 and 7 describe the magnitude of the analog electrical signals 70 and 72 in a first channel 74 between 2490.5-2500.5 MHz, a second channel 76 between 2500.5-2510.5 MHz, a third channel 78 between 2510.5-2520.5 MHz, a fourth channel 80 between 2520.5-2530.5 MHz, and a fifth channel 82 between 2530.5-2540.5 MHz. It should be noted that the analog electrical signals 70 and 72 are merely intended to be illustrative and not limiting.

Figure 6:
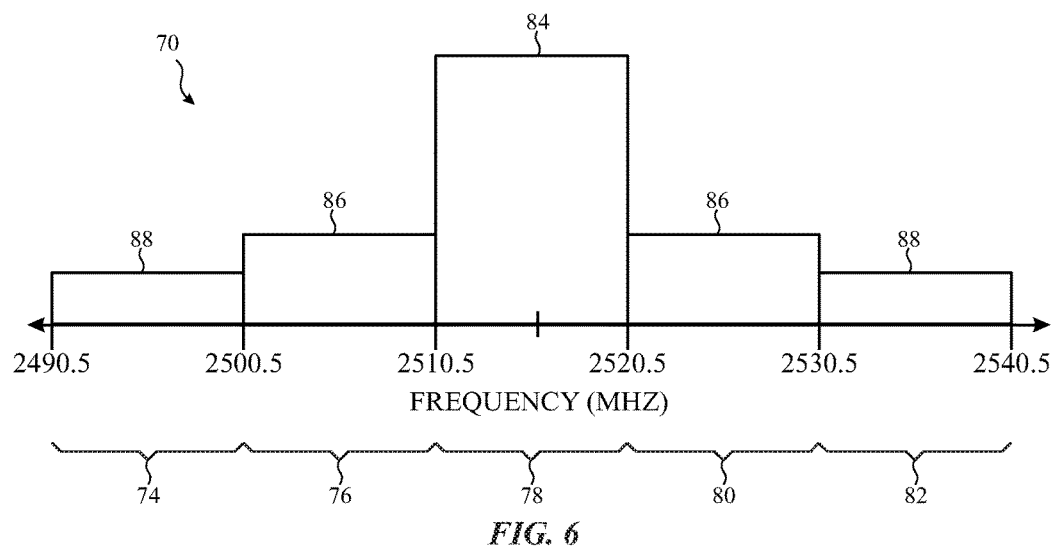
FIG. 6 is a plot of a first analog electrical signal transmitted by the radio frequency system, in accordance with an embodiment.

With regard to FIG. 6, since the radio frequency system 12 is assigned fifty resource blocks, the first analog electrical signal 70 has a desired transmission bandwidth of 10 MHz. Thus, as depicted, the first analog electrical signal 70 includes a data portion 84 between 2510.5-2520.5 MHz. More specifically, the data portion 84 includes the analog representation of the data 54 desired to be wirelessly transmitted to another electronic device and/or a network.

However, as described above, noise may be introduced in the radio frequency system 12, for example, by the transceiver 38. As such, when the introduced noise is mixed in the power amplifier 40, intermodulation spurious emissions may result. Generally odd order intermodulation spurious emissions occur near the transmission frequency. In some embodiments, third order intermodulation spurious emissions may occur in channels directly adjacent to the transmission channel, fifth order intermodulation spurious emissions may occur at channels two channels away from the transmission channel, seventh order intermodulation spurious emissions may occur at channels three channels away from the transmission channel, and so on. For example, in the depicted embodiment, third order intermodulation spurious emissions 86 with a 10 MHz bandwidth occur in the second channel 76 and the fourth channel 80. Additionally, fifth order intermodulation spurious emissions 88 with a 10 MHz bandwidth occur in the first channel 74 and the fifth channel 82.

Figure 7:
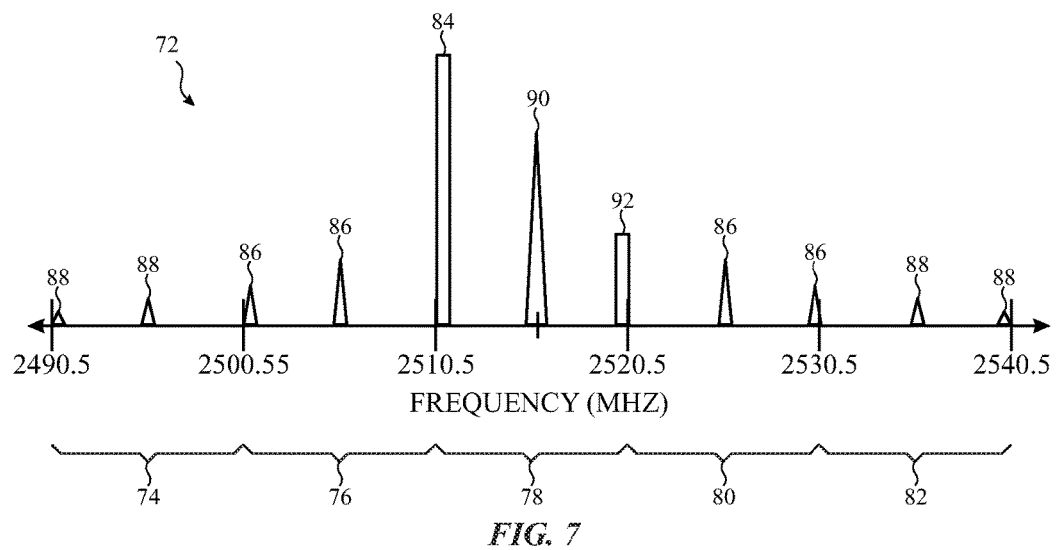
FIG. 7 is a plot of a second analog electrical signal transmitted by the radio frequency system, in accordance with an embodiment.

With regard to FIG. 7, since the radio frequency system 12 is assigned one resource block, the second analog electrical signal 72 has a desired transmission bandwidth of 0.2 MHz. In the depicted embodiment, the second analog electrical signal 72 includes a data portion 84 at frequencies between 2510.5-2510.7 MHz. Thus, the second analog electrical signal 72 is located at the edge of the third channel 78. More specifically, the data portion 84 includes the analog representation of data 54 desired to be wirelessly transmitted to another electronic device and/or a network.

However, in addition to the data portion 84, the analog electrical signal 72 also includes a local oscillator (LO) spurious emission 90 at frequencies between 2515.4-2515.6 MHz and an in-phase quadrature (IQ) spurious emission 92 at frequencies between 2520.3-2520.5 MHz. In some embodiments, the local oscillator spurious emission 90 may be introduced by the transceiver 38 at the central frequencies of the channel (e.g., 2515.5 MHz) since the transceiver 38 is generally tuned to the central frequencies. Additionally, the in-phase quadrature spurious emission 92 may also be introduced by imperfections of the transceiver 38 and occur at frequencies such that the local oscillator spurious emission 90 is between and equidistant from the data portion 84 and the in-phase quadrature spurious emission 92.

Additionally, when the data portion 84, the local oscillator spurious emissions 90, and the in-phase quadrature spurious emission 92 are mixed in the power amplifier 40, intermodulation spurious emissions may result. For example, in the depicted embodiment, third order intermodulation spurious emissions 86 occur in the second channel 76 at frequencies between 2505.4-2505.6 MHz (e.g., as a result of intermodulation between the data portion 84 and local oscillator spurious emission 90) and at frequencies between 2500.5-2500.7 (e.g., as a result of intermodulation between the data portion 84 and the in-phase quadrature spurious emission 92). Similarly, third order intermodulation spurious emissions 86 occur in the fourth channel 80 at frequencies between 2525.4-2525.6 MHz and between 2530.3-2530.5 MHz. Additionally, fifth order intermodulation spurious emissions 88 occur in the first channel 74 at frequencies between 2495.4-2495.6 MHz and between 2590.5-2490.7 MHz. Similarly, fifth order intermodulation spurious emissions 88 occur in the fifth channel 82 at frequencies between 2535.4-2535.6 MHz and between 2540.3-2540.5 MHz.

Thus, as depicted, the spurious emission 86 and 88 generally decrease in magnitude as distance from the transmission frequency increases. For example, the fifth order intermodulation spurious emissions 88 are generally lower in magnitude than the third order intermodulation spurious emissions 86.

Nevertheless, as described above, wireless transmission regulations may place acceptable limits on spurious emissions (e.g., intermodulation spurious emissions 86 and 88), particularly at protected/restricted frequencies. For example, the FCC mandates that spurious emissions between 2490.5-2496 MHz must be less than −13 dBm and that spurious emissions less than 2490.5 MHz must be less than −25 dBm. Thus, the analog electrical signals 70 and 72 result in fifth order intermodulation spurious emissions 88 occurring in the protected frequencies between 2490.5-2496 MHz. Additionally, the analog electrical signals 70 and 72 result in higher odd order intermodulation spurious emissions occurring in protected frequencies less than 2490.5 MHz. As such, to operate within the United States, the radio frequency system 12 should operate such that fifth order intermodulation spurious emission 88 are less than −13 dBm and the higher odd order intermodulation spurious emissions are less than −25 dBm.

Figure 8:
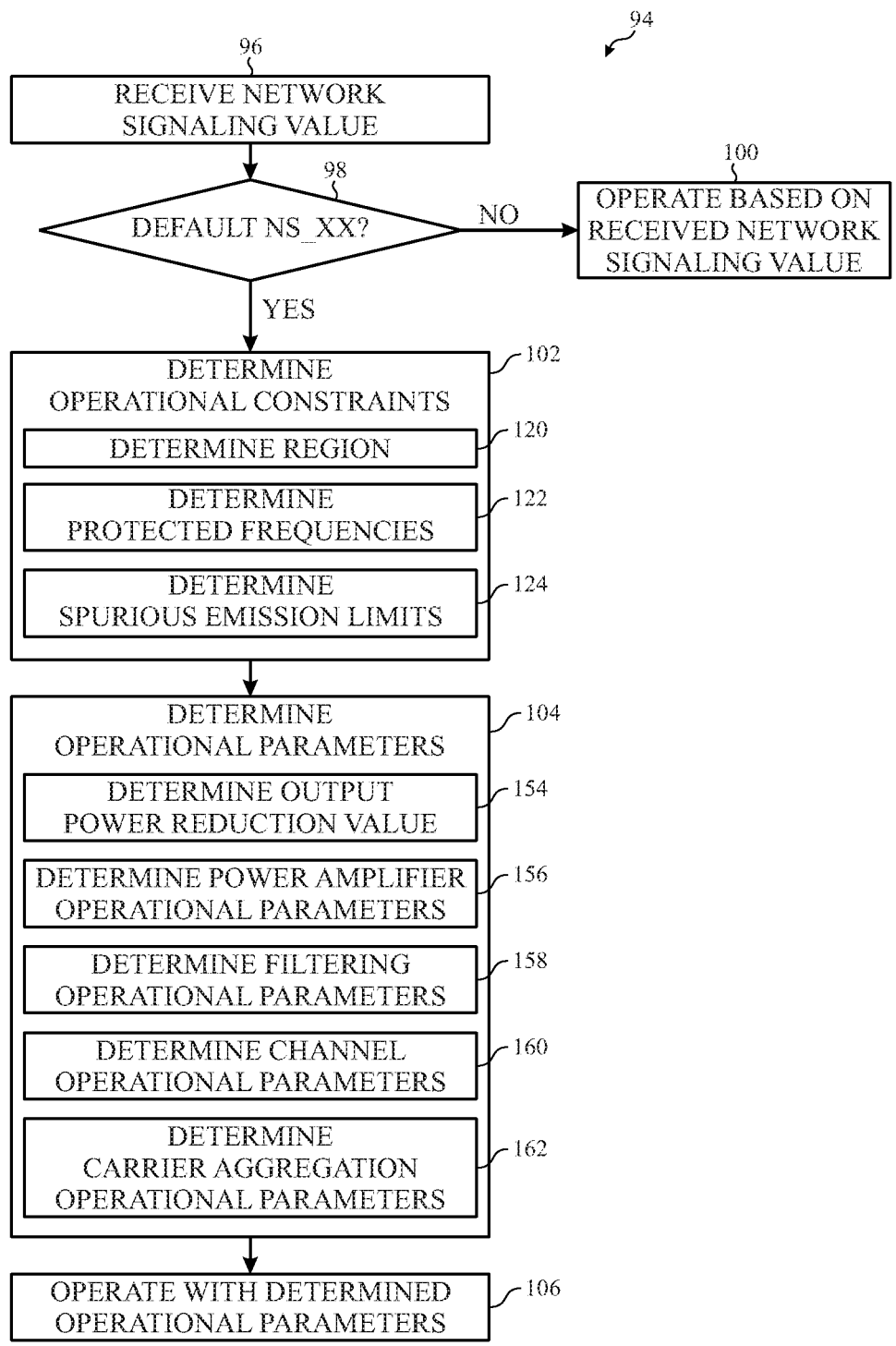
FIG. 8 is a flow diagram of a process for operating the radio frequency system, in accordance with an embodiment.

One embodiment of a process 94 for controlling operation of a radio frequency system 12 is described in FIG. 8. Generally, the process 94 includes receiving a network signaling value (process block 96), determining whether the network signaling value is a default value (decision block 98), and operating based on the received network signaling value when the network signaling value is not the default value (process block 100). When the network signaling value is the default value, the process 94 includes determining operational constraints (process block 102), determining operational parameters (process block 104), and operating with determined operational parameters (process block 106). In some embodiments, the process 94 may be implemented using instructions stored in the controller memory 52 and/or other suitable tangible non-transitory computer-readable medium and executable by the controller processor 50 and/or other suitable processing circuitry.

Accordingly, in such embodiments, the controller 48 may receive a network signaling value (process block 96). In some embodiments, the network signaling value may be transmitted by a wireless service provider when the radio frequency system 12 connects to its network. As such, the antenna 44 may receive an analog representation of the network signaling value, the transceiver 38 may convert the analog representation to a digital representation of the network signaling value, and communicate the digital representation to the controller 48.

The controller 48 may then determine whether the network signaling value is equal to a default value, such as NS_01 or CA_NS_01 (decision block 98). In some embodiments, a wireless service provider may switch from transmitting the default network signaling value to a different network signaling value to indicate different wireless transmission regulations. Thus, in some instances, it is possible for the wireless service provide to inadvertently transmit the default network signaling value instead of the different network signaling value.

Generally, the default network signaling value may correspond with a maximum output power that the radio frequency system 12 is designed to operate at. As such, wireless transmission regulations associated with the default network signaling value may permit more spurious emissions than wireless transmission regulations associated with other network signaling values. In other words, operating based on one of the other network signaling values may still meet wireless transmission regulations associated with the default network signaling value, but not vice versa.

As such, when not the default network signaling value, the controller 48 may instruct the radio frequency system 12 to operate based on the received network signaling value (process block 100). More specifically, the radio frequency system 12 may reduce output power such that the radio frequency system 12 operates in compliance with wireless transmission regulations associated with the received network signaling value. To determine the reduced output power, the controller 48 may apply an output power reduction value to the maximum output power of the radio frequency system 12. In some embodiments, the controller 48 may determine the output power reduction value algorithmically. In other embodiments, the controller 48 may determine the output power reduction using the one or more output power reduction LUTs 60.

Figures 9, 10:
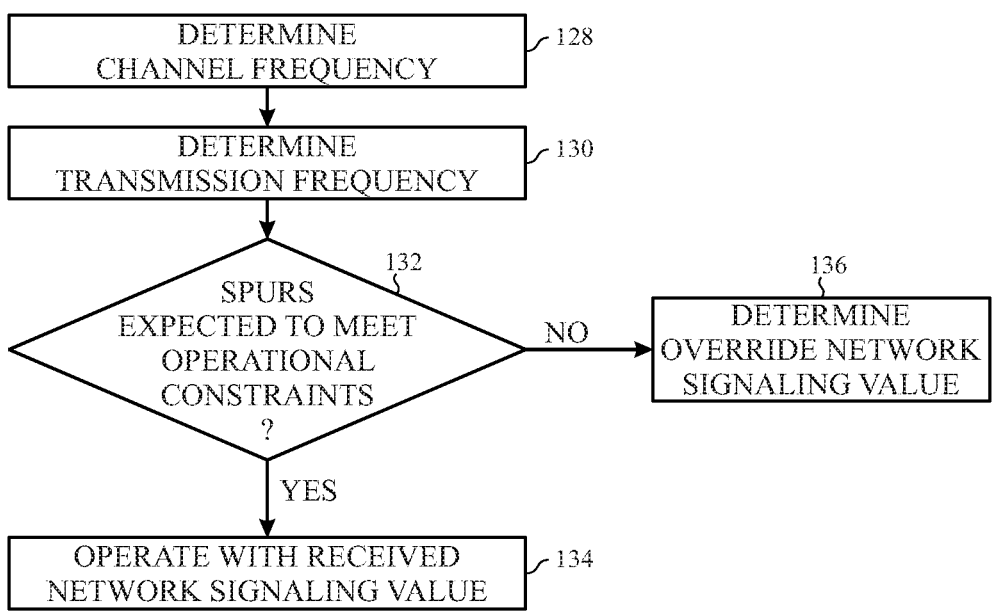
FIG. 9 is an example of an output power reduction look-up-table, in accordance with an embodiment.
FIG. 10 is a flow diagram of a process for determining an override network signaling value, in accordance with an embodiment.

To help illustrate, one example of an output power reduction LUT 60 is described in FIG. 9. More specifically, the described output power reduction LUT 60 is used to determine output power reduction values when the network signaling value is NS_04. Additional output power reduction LUTs 60 may be used to determine output power reduction values for other network signaling values. It should be appreciated that the output power reduction LUT 60 described in FIG. 9 is merely intended to be illustrative and not limiting.

In the depicted embodiment, the output power reduction LUT 60 associates a set of operational parameters (e.g., a channel bandwidth, a starting resource block (RB) in a transmission channel, and number of assigned resource blocks) to an output power reduction value. For example, when the channel bandwidth is 10 MHz and the starting resource block is between 0-12, a first row 108 indicates that the associated output reduction value is 3 dB. When the channel bandwidth is 10 MHz, the starting resource block is between 13-36, and the number of assigned resource block is greater than 37, a second row 110 indicates that the associated output power reduction value is 2 dB. When the channel bandwidth is 10 MHz and the starting resource block is between 37-49, a third row 112 indicates that the associated output power reduction value is 3 dB.

Additionally, when the channel bandwidth is 20 MHz and the starting resource block is between 0-24, a fourth row 114 indicates that the associated output power reduction value is 3 dB. When the channel bandwidth is 20 MHz, the starting resource block is between 25-74, and the number of assigned resource blocks is greater than 74, a fourth row 114 indicates that the associated output power reduction value is 2 dB. When the channel band width is 20 MHz and the starting resource block is between 75-99, a sixth row 118 indicates that the associated output power reduction value is 3 dB. Although only six rows are depicted, it should be appreciated that the output power reduction LUT 60 may associate additional sets of operational parameters (e.g., channel bandwidth, starting resource block, and number of assigned resource blocks) to a corresponding output power reduction value.

Thus, using the one or more output power reduction LUTs 60, the controller 48 may determine an output power reduction value associated with the received network signaling value. The controller 48 may then determine a reduced output power by subtracting the output power reduction value from a maximum output power. For example, when the maximum output power is 23 dB and the output power reduction value is 3 dB, the controller 48 may determine that the reduced output power is 20 dB. The controller 48 may then instruct the radio frequency system 12 to implement the reduced output power, for example, by instruct the power amplifier power supply 46 to adjust the power amplifier supply voltage output to the power amplifier 40.

Returning to the process 94 described in FIG. 8, when the default network signaling value is received, the controller 48 may determine operational constraints on the radio frequency system 12 (process block 102). As used herein, "operational constraints" are intended to describe factors that act to limit or restrict operation of the radio frequency system 12 in some way, such as wireless transmission regulations. For example, the operational constraints may include protected frequencies and/or spurious emission limits for a specific region.

Thus, in some embodiments, the controller 48 may determine a region in which the radio frequency system 12 is operating (process block 120). Various techniques may be utilized to determine the region. For example, the controller 48 may utilize a global positioning system (GPS) to determine the location of the radio frequency system 12 and, thus, the region it is operating in. Additionally or alternatively, the controller 48 may receive an indication of the region from the wireless service provider, a communicatively coupled network, and/or another communicatively coupled electronic device.

Based on the region, the controller 48 may determine protected frequencies in that region (process block 122) and spurious emission limits in that region (process block 124). In some embodiments, associations of regions with protected frequencies and/or spurious emissions limits may be stored in the controller memory 52. Thus, in such embodiments, the controller 48 may retrieve the associations and input the determined region to determine protected frequencies and/or spurious emissions limits for that region.

In other embodiments, the associations may be stored in a communicatively coupled device (e.g., a server). Thus, in such embodiments, the controller 48 may instruct the radio frequency system 12 to communicate the determined region to the other device. In response, the other device may transmit the protected frequencies and/or spurious emissions limits for that region. In this manner, the controller 48 may determine operational constraints even when the correct network signaling value is not received from a wireless service provider.

Based on the operational constraints, the controller 48 may determine operational parameters for the radio frequency system 12 (process block 104). In some embodiments, the operational parameters may include an output power reduction value, power amplifier operational parameters, filtering operational parameters, channel configuration operational parameters, and/or carrier aggregation operational parameters. To facilitate determining the operational parameters, the controller 48 may determine an override network signaling value.

One embodiment of a process 126 for determining the override network signaling value is described in FIG. 10. Generally, the process 126 includes determining channel frequency (process block 128), determining transmission frequency (process block 130), determining whether spurious emissions are likely to meet operational constraints (decision block 132), operating with a received (e.g., default) network signaling value when likely to meet operational constraints (process block 134), and determining an override network signaling value otherwise (process block 136). In some embodiments, the process 126 may be implemented using instructions stored in the controller memory 52 and/or other suitable tangible non-transitory computer-readable medium and executable by the controller processor 50 and/or other suitable processing circuitry.

Accordingly, in such embodiments, the controller 48 may determine frequencies of the channel that the radio frequency system 12 is assigned to transmit in (process block 128). In some embodiments, the channel may be assigned to the radio frequency system 12 by a wireless service provider. Thus, in such embodiments, the radio frequency system 12 may receive an indication of the channel and the frequencies of the channel from the wireless service provider. For example, the antenna 44 may receive an analog representation of the channel frequency, the transceiver 38 may convert the analog representation to a digital representation of the channel frequency, and the controller 48 may determine the channel frequency based on the digital representation.

Additionally, the controller 48 may determine frequencies (e.g., resource blocks) in the channel that the radio frequency system 12 is assigned to transmit at (process block 130). In some embodiments, the wireless service provider may assign resource blocks to the radio frequency system 12. Thus, in such embodiments, the radio frequency system 12 may receive an indication of the assigned transmission frequency from the wireless service provider. For example, the antenna 44 may receive an analog representation of the assigned transmission frequency, the transceiver 38 may convert the analog representation to a digital representation of the assigned transmission frequency, and the controller 48 may determine the assigned transmission frequency based on the digital representation.

Based on the channel frequency and the transmission frequency, the controller 48 may determine whether spurious emissions are expected to meet the operational constraints on the radio frequency system 12 (decision block 132). In some embodiments, the controller 48 may make the determination using the one or more network signaling value (NS_XX) override LUTs 58. More specifically, the one or more network signaling value override LUTs 58 may indicate an override network signaling value when the radio frequency system 12 is not expected to meet the operational constraints.

Figures 11, 12:
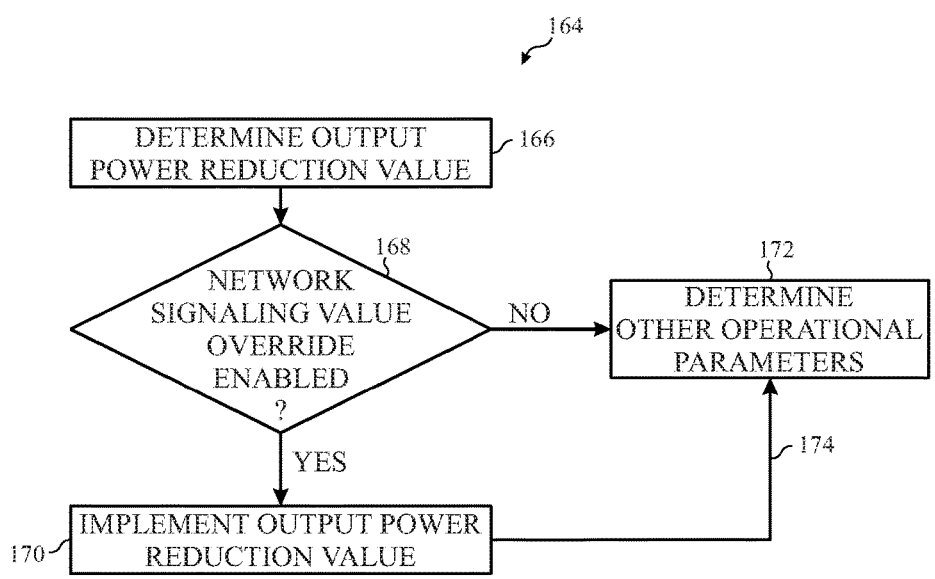
FIG. 11 is an example of a network signaling value override look-up-table, in accordance with an embodiment.
FIG. 12 is a flow diagram of a process for using an output power reduction value, in accordance with an embodiment.

To help illustrate, one example of a network signaling value override LUT 58 is described in FIG. 11. The described network signaling value override LUT 58 is used to determine override network signaling values when the radio frequency system 12 is operating in band 41 (e.g., 2496-2690 MHz). Additional network signaling value override LUTs 58 may be used to determine override network signaling values for other frequency bands. It should be appreciated that the network signaling value override LUT 58 described in FIG. 11 is merely intended to be illustrative and not limiting.

In the depicted embodiment, the network signaling value override LUT 58 associates a set of operational parameters (e.g., channel frequency and transmission frequency) to an override network signaling value. Additionally, the network signaling value override LUT 58 may be used to facilitate compliance with spurious emissions limits for protected frequencies between 2490.5-2496 MHz. As described above, magnitude of spurious emissions may decrease as distance from the transmission frequency increases. For example, when the transmission frequency is 2510.5-2530.5 MHz, a first row 138 indicates an override network signaling value. On the other hand, when the transmission frequency is 2530.5-2550.5, a second row does not indicate an override network signaling value.

Additionally, as described above, intermodulation spurious emissions may occur in each channel adjacent the transmission channel. As such, spread of spurious emissions may increase as the channel frequency (e.g., bandwidth) increases. For example, when the channel frequency is 2510.5-2530.5 MHz, a third row 142 indicates an override network signaling value. On the other hand, when the channel frequency is 2510.5-2520.5 MHz, a fourth row 144 does not indicate a network signaling value.

Furthermore, as described above, LO spurious emissions and IQ spurious emissions leakage may occur when the transmission frequency does not include the center frequency of the channel. As such, number of spurious emissions may increase when the transmission frequency is not centered. For example, when the channel frequency is 2510.5-2520.5 MHz and the transmission frequency is 2510.5-2510.6 MHz, a fifth row 146 indicates an override network signaling value. On the other hand, when the channel frequency is 2510.5-2520.5 and the transmission frequency is 2515.5-2515.7, a sixth row 148 does not indicate an override network signaling value. Although only six rows are depicted, it should be appreciated that network signaling value override LUT 58 may associate other sets of operational parameters (e.g., channel frequency and transmission frequency) to override network signaling values.

Since an override network signaling value is not indicated, operating the radio frequency system 12 with any of operational parameters sets listed in the second row 140, the fourth row 144, or the sixth row is expected to meet the operational constraints. Thus, returning to process 126 of FIG. 10, the controller 48 may instruct radio frequency system 12 to operate with the received network signaling value when an override network signaling value is not indicated (process block 134).

On the other hand, since an override network signaling value is indicated, operating the radio frequency system 12 with any of the operational parameter sets listed in the first row 138, the third row 142, or the fifth row 146 is not expected to meet the operational constraints. Thus, the controller 48 may instruct radio frequency system 12 to determine the override network signaling value based at least in part on the channel frequency and the transmission frequency (process block 136). As described above, the override network signaling value may then be used to determine operational parameters, which when implemented facilitate operation in compliance with operational constraints.

Accordingly, returning to process 94 of FIG. 8, the controller 48 may then determine operational parameters based at least in part on the override network signaling value. For example, in some embodiments, the controller 48 may determine an output power reduction value (process block 154). As described above, the controller 48 may determine the output power reduction value using the one or more output power reduction LUTs 60 based on the override network signaling value.

Additionally or alternatively, the controller 48 may determine other operational parameters based at least in part on the override network signaling value and/or the output power reduction value. For example, the controller 48 may determine power amplifier operational parameters (process block 156), filtering operational parameters (process block 158), channel configuration operational parameters (process block 160), and/or carrier aggregation operational parameters (process block 162). In some embodiments, various sets of operational parameters may enable the radio frequency system 12 to operate in compliance with the operational constraints. For example, using the output power reduction value to reduce output power and adjusting power amplifier operational parameters to improve linearity may both enable the radio frequency system 12 to operate in compliance with operational constraints.

However, adjustments to different operational parameters may have varying affects on the radio frequency system 12. For example, using the output power reducing value to reduce output power may reduce transmission distance of the radio frequency system 12 and/or integrity of received signals. On the hand, adjusting power amplifier operational parameters to increase linearity may increase power consumption of the radio frequency system 12. As such, in some embodiments, the controller 48 may adjust different types of operational parameters to facilitate meeting operational constraints for different based on operational parameters of the radio frequency system 12.

To help illustrate, one embodiment of a process 164 for using operational parameters of the radio frequency system 12 is described in FIG. 12. Generally, the process 164 includes determining the output power reduction value (process block 166), determining whether network signaling override is enabled (decision block 168), implementing the output power reduction value when enabled (process block 170), and determining other operational parameters when not enabled (process block 172). In some embodiments, the process 164 may be implemented using instructions stored in the controller memory 52 and/or other suitable tangible non-transitory computer-readable medium and executable by the controller processor 50 and/or other suitable processing circuitry.

Accordingly, in such embodiments, the controller 48 may determine the output power reduction value (process block 166). As described above, the controller 48 determine the output power reduction value using the one or more output power reduction LUTs 60 based on the override network signaling value. For example, the first row 138 of the network signaling value override LUT 58 described in FIG. 11 indicates that the channel bandwidth is 20 MHz, the override network signaling value is NS_04, and the starting resource block is 0. Similarly, the third row 142 indicates that the channel bandwidth is 20 MHz, the override network signaling value is NS_04, and the starting resource block is 0. Thus, based on the fourth row 144 of the output power reduction LUT 60 described in FIG. 9, the controller 48 may determine that the output power reduction value for both instances is 3 dB.

The controller 48 may then determine whether to implement the output power reduction value based on whether network signaling value override is enabled (decision block 168). In some embodiments, the controller 48 may determine whether network signaling value override is enabled using the one or more network signaling value override LUTs 58. For example, the first row 138 of the network signaling value override LUT 58 described in FIG. 11 indicates that an override setting is enabled. As such, the controller 48 may instruct the radio frequency system to reduce output power based on the output power reduction value (e.g., 3 dB) (process block 170).

On the other hand, the second row 140 indicates that the override setting is disabled. As such, the controller 48 may determine other operational parameters based at least in part on the override network signaling value and/or the output power reduction value (process block 172). In some embodiments, the controller 48 may determine other operational parameters to implement in addition to the output power reduction value (arrow 174). As described above, the other operational parameters may include power amplifier operational parameters, filtering operational parameters, carrier aggregation operational parameters, and/or channel configuration operational parameters.

Figure 13:
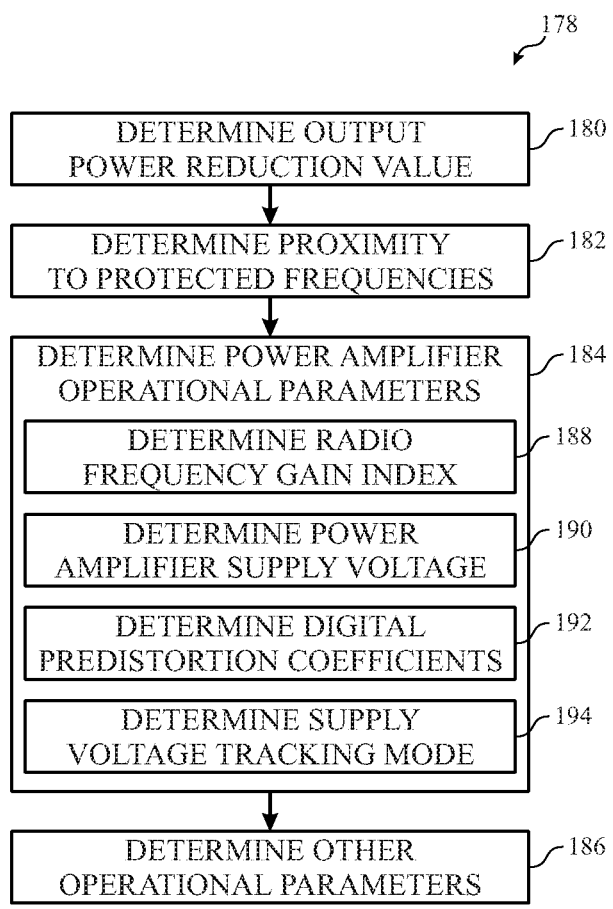
FIG. 13 is a flow diagram of a process for determining power amplifier operational parameters, in accordance with an embodiment.

One embodiment of a process 178 for determining power amplifier operational parameters is described in FIG. 13. Generally, the process 178 includes determining the output power reduction value (process block 180), determining proximity to protected frequencies (process block 182), determining power amplifier operational parameters (process block 184), and optionally determining other operational parameters (process block 186). In some embodiments, the process 178 may be implemented using instructions stored in the controller memory 52 and/or other suitable tangible non-transitory computer-readable medium and executable by the controller processor 50 and/or other suitable processing circuitry.

Accordingly, in such embodiments, the controller 48 may determine the output power reduction value (process block 180). As described above, the controller 48 determine the output power reduction value using the one or more output power reduction LUTs 60 based on the override network signaling value.

Since magnitude of spurious emissions generally decrease as distance from the transmission frequency increases, the controller 48 may determine proximity of the transmission frequency (e.g., assigned resource blocks) to protected frequencies (process block 182). To determine the proximity, the controller 48 may determine the transmission frequency from a wireless service provider and the protected frequencies based on region the radio frequency system 12 is operating. The controller 48 may then determine proximity based on difference between the two. For example, when the transmission frequency is 2500-2510 MHz and the protected frequency is 2490.5-2496 MHz, the controller 48 may determine that the protected frequency is 4 MHz from the transmission frequency.

Based on the output power reduction value and the proximity to protected frequencies, the controller 48 may determine power amplifier operational parameters (process block 184). For example, the controller 48 may determine a radio frequency gain index (RGI) (process block 188), power amplifier supply voltage (process block 190), digital predistortion coefficients (process block 192), and/or supply voltage tracking mode (process block 194). In some embodiments, the controller 48 may determine the power amplifier operational parameters algorithmically. Additionally or alternatively, the controller 48 may determine the power amplifier operational parameters using the one or more power amplifier operational parameter LUTs 62.

To help illustrate, one example of a power amplifier operational parameter LUT 62 is described in FIG. 3. More specifically, the described power amplifier operational parameter LUT 62 describes association between sets of operational parameters (e.g., output power reduction value and proximity to protected frequency) with a set of power amplifier operational parameters, which include a radio frequency gain index, a peak power amplifier supply voltage, digital predistortion coefficients, an envelope tracking detrough function or shaping table, and a tracking mode. It should be appreciated that the power amplifier operational parameter LUT 62 is merely intended to be illustrative and not limiting.

As described above, the power amplifier operational parameters may be adjusted to improve linearity of the power amplifier 40. For example, the radio frequency gain index may indicate a peak voltage of the analog electrical signal generated by the transceiver 38 and input to the power amplifier 40. Accordingly, decreasing the radio frequency gain index may decrease compression in the power amplifier 40, thereby improving linearity. Additionally, the digital predistortion coefficients may be applied by the digital predistortion circuitry 37 to the digital electrical signal output by the digital signal generator 36. Accordingly, adjusting the digital predistortion coefficients to offset distortion introduced by the radio frequency system 12 may improve linearity of the power amplifier 40.

Furthermore, the power amplifier 40 may be operated in an average power tracking mode or an envelope tracking mode. When operating in average power tracking mode, the power amplifier power supply 46 determine average output power over a control duration (e.g. time slot) and adjust the power amplifier supply voltage after each control duration. On the other hand, when operating in envelope tracking mode, the power amplifier power supply 46 may adjust the power amplifier supply voltage dynamically based on the voltage of the analog electrical signal input from the transceiver 38. In some embodiments, the power amplifier supply voltage may change as a function of the voltage of the analog electrical signal input to the power amplifier 40 from the transceiver 38. As used herein a "detrough function" is intended to describe the power amplifier supply voltage as a function of the input analog electrical signal voltage such that the peak voltage of the input analog electrical signal results in the peak power amplifier supply voltage. In other words, different detrough functions may describe different corresponding power amplifier supply voltages when the input analog electrical signal is modulated (e.g., reduced below the peak voltage).

In some embodiments, operating the power amplifier 40 in average power tracking mode may produce spurious emissions over a smaller range of frequencies compared to envelope tracking mode. Thus, when protected frequencies are closer to the transmission frequency than a threshold, the controller 48 may instruct the power amplifier power supply 46 and the power amplifier 40 to operate in average power tracking mode. For example, when the output power reduction value is 3 dB and the proximity to the protected frequency is 40 MHz (e.g., greater than the threshold), a first row 196 indicates that the power amplifier operational parameters include operating in envelope tracking mode. On the other hand, when the output power reduction value is 3 dB and the proximity to the protected frequency is 4 MHz (e.g., less than the threshold), the second row 198 indicates that the power amplifier operational parameters include operating in average power tracking mode.

Additionally, in some embodiments, operating the power amplifier 40 in envelope tracking mode may enable reducing power consumption of the radio frequency system at higher output powers. However, at lower output powers, power consumption used to track voltage of the input analog electrical signal may outweigh the power savings. Thus, when output power reduction value increases above a threshold (e.g., 7 dB), thereby decreasing the output power, the controller 48 may instruct the power amplifier power supply 46 and the power amplifier 40 to operate in average power tracking mode. For example, when the output power reduction value is 6 dB, a third row 200 indicates that the operational parameters include operating in envelope tracking mode. On the other hand, when the output power reduction value is 7 dB, a fourth row 202 indicates that the operational parameters include operating in average power tracking mode. In this manner, the controller 48 may determine power amplifier operational parameters that may be implemented to facilitate the radio frequency system 12 operating in compliance with operational constraints.

Figure 15:
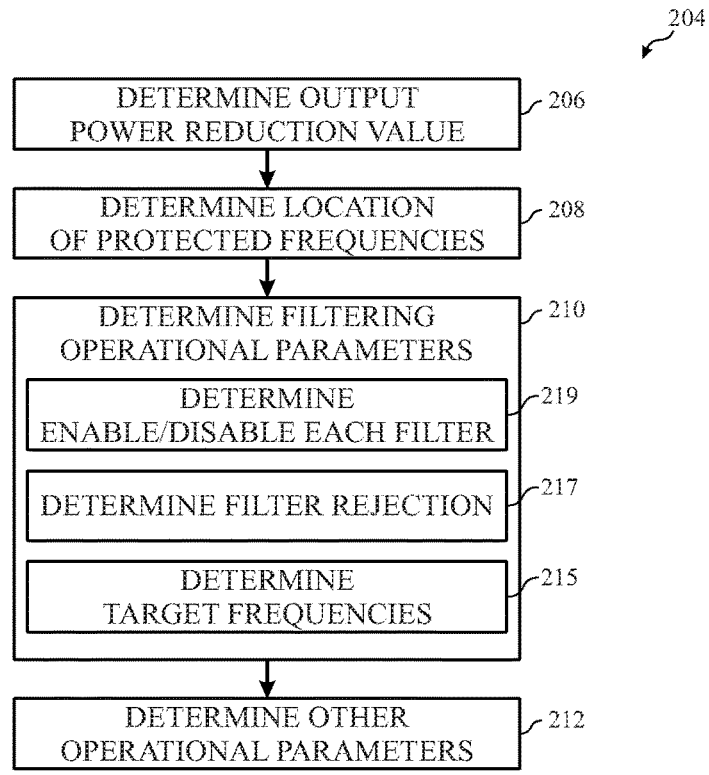
FIG. 15 is a flow diagram of a process for determining filtering operational parameters, in accordance with an embodiment.

Additionally or alternatively, the controller 48 may determine filtering operational parameters. To help illustrate, one embodiment of a process 204 for determining filtering operational parameters is described in FIG. 15. Generally, the process 204 includes determining an output power reduction value (process block 206), determining location of protected frequencies (process block 208), determining filtering operational parameters (process block 210), and optionally determining other operational parameters (process block 212). In some embodiments, the process 204 may be implemented using instructions stored in the controller memory 52 and/or other suitable tangible non-transitory computer-readable medium and executable by the controller processor 50 and/or other suitable processing circuitry.

Accordingly, in such embodiments, the controller 48 may determine the output power reduction value (process block 206). As described above, the controller 48 determines the output power reduction value using one or more output power reduction LUTs 60 based on the override network signaling value. Additionally, the controller 48 may determine the location of protected frequencies based on the region in which the radio frequency system 12 is operating (process block 208).

Based on the output power reduction value and the location of protected frequencies, the controller 48 may determine filtering operational parameters (process block 210). More specifically, in some embodiments, the controller 48 may determine target frequencies of a filter based at least in part on the location of protected frequencies (process block 215). For example, when protected frequencies are located at 2490.5-2496 MHz, the controller 48 may determine that filtering should be targeted to frequencies less than 2496 MHz.

Additionally, in some embodiments, the controller 48 may determine filter rejection based at least in part on the output power reduction value (process block 217). As described above, the output power may be reduced to reduce magnitude of spurious emissions. Thus, the filter rejection may be determined so that approximately the same reduction in spurious emission magnitude may be achieved as the reduction in output power.

Furthermore, the controller 48 may enable or disable a filter based at least in part on the determined filter rejection and target frequencies (process block 219). In embodiments where the radio frequency system 12 includes multiple filters that can be selectively enabled and disabled, the controller 48 may enable a filter that has the determined filter rejection and target frequencies and disable the other filters. In embodiments where the radio frequency system 12 includes a configurable (e.g., a tunable) filter, the controller 48 may enable the filter and instruct the filter to implement the determined filter rejection at the target frequencies. In this manner, the controller 48 may determine filtering operational parameters that may be implemented to facilitate the radio frequency system 12 operating in compliance with operational constraints.

Figure 16:
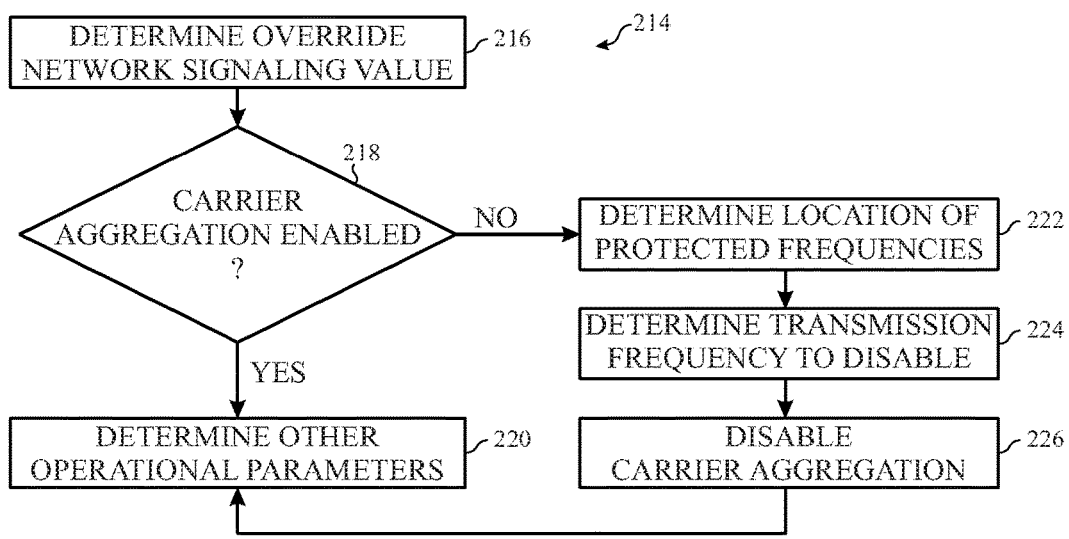
FIG. 16 is a flow diagram of a process for determining carrier aggregation operational parameters, in accordance with an embodiment.

Additionally or alternatively, the controller 48 may determine carrier aggregation operation parameters. To help illustrate, one embodiment of a process 214 for determining carrier aggregation operational parameters is described in FIG. 16. Generally, the process 214 includes determining an override network signaling value (process block 216), determining whether carrier aggregation is enabled (decision block 218), and when disabled determining other operational parameters (process block 220). When enabled, the process 214 includes determining location of protected frequencies (process block 222), determining transmission frequency to disable (process block 224), and disabling carrier aggregation (process block 226). In some embodiments, the process 214 may be implemented using instructions stored in the controller memory 52 and/or other suitable tangible non-transitory computer-readable medium and executable by the controller processor 50 and/or other suitable processing circuitry.

Accordingly, in such embodiments, the controller 48 may determine the override network signaling value (process block 216). As described above, in some embodiments, the controller 48 may determine the override network signaling value based on channel frequency and transmission frequency using the one or more network signaling value override LUTs 58.

Additionally, the controller 48 may determine whether carrier aggregation is enabled (decision block 218). In some embodiments, carrier aggregation may be enabled by the network signaling value received from a wireless service provider. For example, carrier aggregation may be enabled when a network signaling value CA_NS_XX is received. In such embodiments, the antenna 44 may receive an analog representation of the carrier aggregation network signaling value, the transceiver 38 may convert the analog representation to a digital representation of the carrier aggregation network signaling value, and the controller 48 may determine the carrier aggregation network signaling value based on the digital representation.

When carrier aggregation is enabled, the controller 48 may determine location of protected frequencies (process block 222). In some embodiments, the controller 48 may determine location of the protected frequencies based at least in part on the region it is operating. Additionally, the controller 48 may determine transmission frequency to disable based at least in part on the location of the protected frequencies (process block 224). As such, in some embodiments, the controller 48 may determine its assigned transmission frequency from a wireless service carrier.

Figure 17:
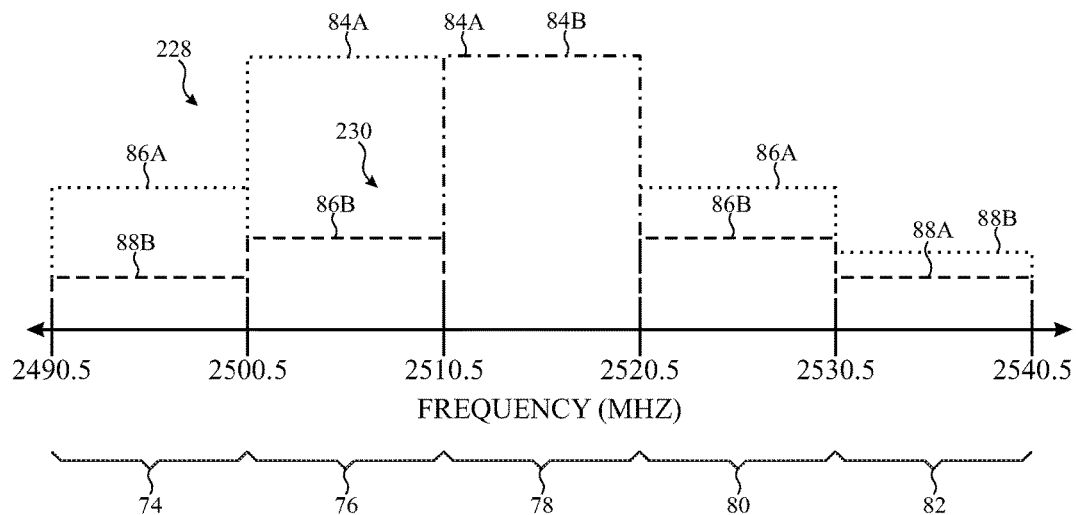
FIG. 17 is a plot of a first analog electrical signal with carrier aggregation enabled and a second analog electrical signal with carrier aggregation disabled transmitted by the radio frequency system, in accordance with an embodiment.
Figure 18:
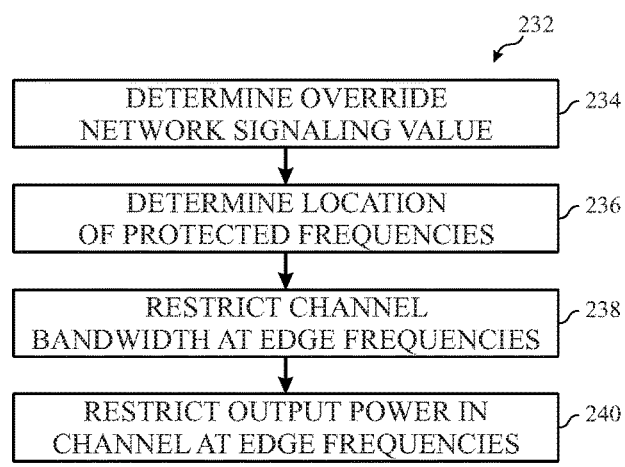
FIG. 18 is a flow diagram of a process for determining channel configuration operational parameters, in accordance with an embodiment.

To help illustrate effects of carrier aggregation, FIG. 17 describes a first analog electrical signal 228 with carrier aggregation enabled and a second analog electrical signal 230 with carrier aggregation disabled. In the depicted embodiments, the radio frequencies are divided into channels with bandwidths of 10 MHz. As such, FIG. 18 describe the magnitude of the analog electrical signals 228 and 230 in the first channel 74 between 2490.5-2500.5 MHz, the second channel 76 between 2500.5-2510.5 MHz, the third channel 78 between 2510.5-2520.5 MHz, the fourth channel 80 between 2520.5-2530.5 MHz, and the fifth channel 82 between 2530.5-2540.5 MHz. It should be noted that the analog electrical signals 228 and 230 are merely intended to be illustrative and not limiting.

Since the channel bandwidth is 10 MHz, the radio frequency system 12 may be assigned one hundred resource blocks when carrier aggregation is enabled. In other words, effectively, the radio frequency system 12 may utilize a transmission bandwidth of 20 MHz. Thus, as depicted, the first analog electrical signal 228 includes a data portion 84A between 2500.5-2520.5 MHz.

In addition to the data portion 84A, the first analog electrical signal 228 includes third order intermodulation spurious emissions 86A with a 10 MHz bandwidth in the first channel 74 and the fourth channel 80. Additionally, the first analog electrical signal 228 includes fifth order intermodulation spurious emissions 88A with a 10 MHz bandwidth in the fifth channel 82 and in the 2480.5-2490.5 MHz channel. However, as depicted, the magnitude of the spurious emissions 86A and 88A may be greater due to the increased transmission bandwidth.

Thus, to reduce spurious emissions, the controller 48 may reduce the transmission bandwidth by instructing the radio frequency system 12 to disable carrier aggregation. For example, in the depicted embodiment, the controller 48 may instruct the radio frequency system 12 to transmit using fifty resource blocks, thereby reducing transmission bandwidth to 10 MHz. In this manner, magnitude of spurious emissions may be reduced.

As such, the second analog electrical signal 230 includes a data portion 84B between 2510.5-2520.5 MHz. In addition to the data portion 84B, the second analog electrical signal 230 includes third order intermodulation spurious emissions 86B with a 10 MHz bandwidth in the first channel 74 and the fourth channel 80. Additionally, the second analog electrical signal 230 includes fifth order intermodulation spurious emissions 88B with a 10 MHz bandwidth in the fifth channel 82 and the first channel 74.

As depicted, due to the larger transmission bandwidth, the magnitude of the spurious emissions 86A and 88A of the first analog electrical signal 228 may be greater than the spurious emissions 86B and 88B of the second analog electrical signal 230. Moreover, due to the selection of the resource blocks, the order of intermodulation spurious emissions 86A produced by the first analog electrical signal 228 is lower than the order of the intermodulation spurious emissions 88B produced by the second analog electrical signal 230 in the protected frequencies 2490.5-2496 MHz. As such, in the protected frequencies, the magnitude of the third order intermodulation spurious emissions 86A is greater than the magnitude of the fifth order intermodulation spurious emissions 88B. In this manner, the controller 48 may determine carrier aggregation operational parameters that may be implemented to facilitate the radio frequency system 12 operating in compliance with operational constraints.

Additionally or alternatively, the controller 48 may determine channel operation parameters. To help illustrate, one embodiment of a process 232 for determining channel configuration operational parameters is described in FIG. 18. Generally, the process 232 includes determining an override network signaling value (process block 234), determining location of protected frequencies (process block 236), restricting bandwidth of a channel at edge frequencies (process block 238), and/or restricting output power in the channel (process block 240). In some embodiments, the process 232 may be implemented using instructions stored in the controller memory 52 and/or other suitable tangible non-transitory computer-readable medium and executable by the controller processor 50 and/or other suitable processing circuitry.

Accordingly, in such embodiments, the controller 48 may determine the override network signaling value (process block 234). As described above, in some embodiments, the controller 48 may determine the override network signaling value based on channel frequency and transmission frequency using the one or more network signaling value override LUTs 58. Additionally, the controller 48 may determine the location of protected frequencies based on region the radio frequency system 12 is operating (process block 236). In some embodiments, the controller 48 may determine the location of protected frequencies based on region it is operating.

Based at least in part on the location of protected frequencies, the controller 48 may restrict bandwidth of a channel at edge frequencies (process block 238) and/or restrict output power in the channel at the edge frequencies (process block 240). As used herein, "edge frequencies" are intended to describe frequencies that are within a threshold from the protected frequencies.

Figure 19:
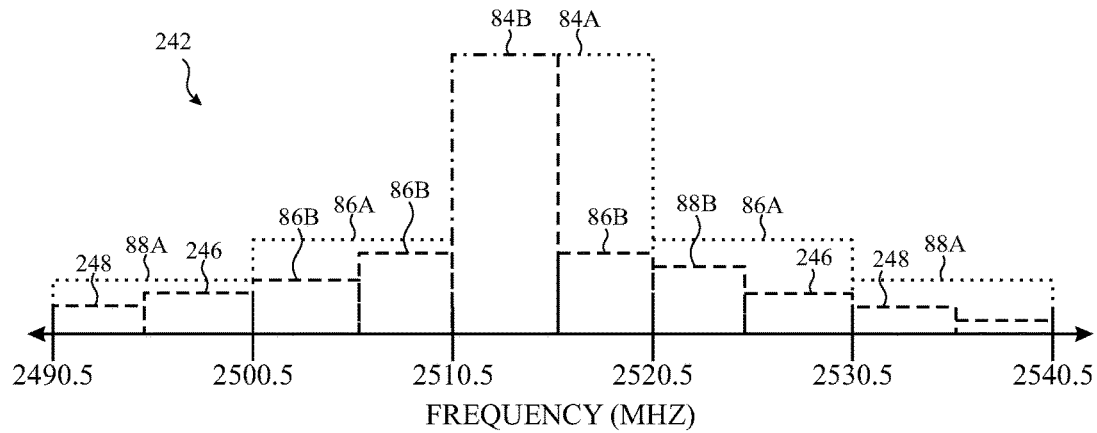
FIG. 19 is a plot of a first analog electrical signal using a 10 MHz channel bandwidth and a second analog electrical signal using a 5 MHz channel bandwidth transmitted by the radio frequency system, in accordance with an embodiment.

To help illustrate the effects signals transmitted at edge frequencies, FIG. 19 describes a first analog electrical signal 242 transmitted in a 10 MHz channel and a second analog electrical signal 244 transmitted in a 5 MHz channel. As depicted, the first analog electrical signal 242 includes a data portion 84A between 2510.5-2520.5 MHz. In addition to the data portion 84A, the first analog electrical signal 242 includes third order intermodulation spurious emissions 86A between 2500.5-2510.5 MHz and between 2520.5-2530.5 MHz. Additionally, the first analog electrical signal 242 includes fifth order intermodulation spurious emissions 88A between 2490.5-2500.5 MHz and between 2530.5-2540.5 MHz.

On the other hand, the second analog electrical signal 244 includes a data portion between 2510.5-2515.5 MHz. In addition to the data portion 84B, the second analog electrical signal 244 includes third order intermodulation spurious emissions 86B between 2505.5-2510.5 MHz and between 2515.5-2520.5 MHz and fifth order intermodulation spurious emissions 88B between 2500.5-2505.5 MHz and between 2520.5-2525.5 MHz. Additionally, the second analog electrical signal 244 includes seventh order intermodulation spurious emissions 246 between 2495.5-2500.5 MHz and between 2530.5-2535.5 MHz and ninth order intermodulation spurious emissions 248 between 2490.5-2495.5 MHz and between 2530.5-2535.5 MHz.

Thus, both the first analog electrical signal 242 and the second analog electrical signal 244 include spurious emissions that fall within protected frequencies between 2490.5-2496 MHz. More specifically, the first analog electrical signal 242 may produce third order intermodulation spurious emission 88A in the protected frequencies. On the other hand, the second analog electrical signal 244 may produce seventh order intermodulation spurious emissions 246 and ninth order intermodulation spurious emissions 248 in the protected frequencies. Thus, due to the higher orders of intermodulation, the spurious emissions produced by the second analog electrical signal 244 in the protected frequencies may be less than the spurious emissions produced by the first analog electrical signal 242.

Accordingly, the controller 48 may restrict channel bandwidth in edge frequencies to magnitude of spurious emissions produced in the protected frequencies. For example, the controller 48 may restrict channel bandwidth to 5 MHz or less and disable channel bandwidths greater than 5 MHz. In some embodiments, the controller 48 may restrict channel bandwidth based on proximity to protected frequencies. For example, the controller 48 may enable 10 MHz channel bandwidths at frequencies greater than 2520.5 MHz because resulting spurious emissions in the protected frequencies will be fifth order or higher. In such an embodiment, the edge frequencies may be defined as frequencies as less than 2520.5 MHz.

In fact, in some embodiments, a wireless service provider may recognize the possibility of certain channel bandwidth s at edge frequencies causing spurious emissions that are not in compliance with wireless transmission regulations. As such, in actual operation, the wireless service provider may proactively disable those channel bandwidths at the edge frequencies. In such instances, the radio frequency system 12 may provide an additional safeguard and similarly disable those channel bandwidths at the edge frequencies.

Additionally, in some embodiments, the controller 48 may restrict output power at edge frequencies to limit magnitude of spurious emissions in the protected frequencies. For example, the controller 48 may restrict output power by applying a mask to analog electrical signals transmitted in the edge frequencies. In this manner, the controller 48 may determine channel configuration operational parameters that may be implemented to facilitate the radio frequency system 12 operating in compliance with operational constraints.

Thus, returning to process 94 of FIG. 8, the controller 48 may instruct the radio frequency system 12 to implement any combination of the output power reduction value, power amplifier operational parameters, filtering operational parameters, carrier aggregation operational parameters, and channel configuration operational parameters to facilitate operating in compliance with operational constraints (e.g., wireless transmission regulations). As described above, in some embodiments, the various operational parameters may be determined using calibration data 56 stored in the controller memory 52. Accordingly, in such embodiments, a manufacturer may determine and store the calibration data 56 in the radio frequency system 12.

Figure 20:
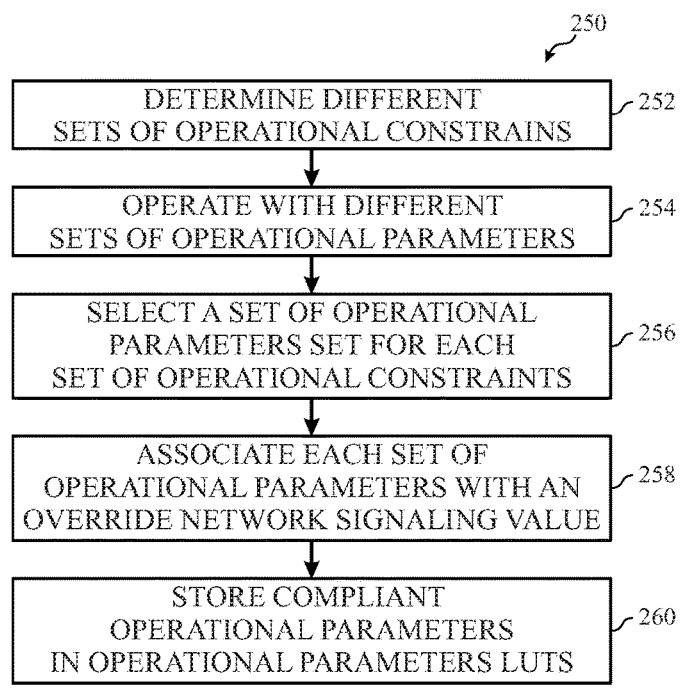
FIG. 20 is a flow diagram of a process for determining configuration data used to operate the radio frequency system, in accordance with an embodiment.

One embodiment of a process 250 for determining the calibration data 56 is described in FIG. 20. Generally, the process 250 includes determining different sets of operational constraints (process block 252), operating with different sets of operational parameters (process block 254), determining whether radio frequency system operates in compliance with operational constraints (process block 256), associate noncompliant operational parameters with an override network signaling value (process block 258), and store compliant operational parameters in operational parameter look-up-tables (process block 260).

For example, a manufacturer may determine different sets of operational constraints (process block 252). In some embodiments, the manufacturer may determine regions the radio frequency system 12 is designed to operate in. The manufacturer may then determine wireless transmission regulations (e.g., operational constraints) for those regions, which may include protected frequencies and/or spurious emission limits. Additionally, the manufacturer may operate the radio frequency system 12 using different sets of operational parameters (process block 254). For example, the manufacturer may operate the radio frequency system 12 with different transmission frequency and channel frequency pairs.

The manufacturer may then determine whether operating with each set of operational parameters causes the radio frequency system 12 to be in compliance or noncompliance with each set of operational constraints (process block 258). For example, the manufacturer may determine spurious emissions that result in protected frequencies when operating with a set of operational parameters and compare the spurious emissions with spurious emission limits. In this manner, the manufacturer may determine whether the operating with the set of operational parameters facilitates compliance with operational constraints (e.g., spurious emission limits).

Operational parameters that cause the radio frequency system 12 to operate out of compliance with operational constraints may be associated with an override network signaling value (process block 258). For example, sets of operational parameters (e.g., a channel frequency and transmission frequency pair) that result in noncompliance with operational constraints may be associated with the network signaling value. In some embodiments, the association may be stored in one or more network signaling value override LUTs 58.

The manufacturer may determine the override network signaling value to associate with each set of operational parameters based at least in part on what frequency band includes the channel frequency and the transmission frequency. For example, when the channel frequency and the transmission frequency are between 2496-2690 MHz, the manufacturer may determine that the radio frequency system is operating in band 41. The manufacturer may then determine that the override network signaling value associated with the set of operational parameters is NS_04.

On the other hand, operational parameters that cause the radio frequency system 12 to operate in compliance with operational constraints may be stored in one or more operational parameter look-up-tables (process block 260). For example, an operational parameter set (e.g., override network signaling value, channel bandwidth, starting assigned resource block, and number of assigned resource blocks) may be associated with an output power reduction value that facilitate compliance with operational constraints. In some embodiments, the association may be stored in one or more output power reduction LUTs 60

Additionally, an operational parameter set (e.g., output power reduction value and a proximity to protected frequencies) may be associated with power amplifier operational parameters that facilitate compliance with operational constraints. In some embodiments, the power amplifier operational parameters may include a radio frequency gain index (RGI), a peak power amplifier supply voltage, digital pre-distortion coefficients, a detrough function, and/or tracking mode. Additionally, in some embodiments, the association may be stored in one or more power amplifier operational parameter LUTs 62.

Furthermore, an operational parameter set (e.g., output power reduction value and location of protected frequencies) may be associated with filtering operational parameters that facilitate compliance with operational constraints. In some embodiments, the filtering operational parameters may include whether to enable/disable a filter, filter rejection of an enabled filter, and/or target frequencies of the enabled filter. Additionally, in some embodiments, the association may be stored in one or more filtering operational parameter LUTs 64.

An operational parameter set (e.g., carrier aggregation setting and location of protected frequencies) may be associated with carrier aggregation operational parameters that facilitate compliance with operational constraints. In some embodiments, the carrier aggregation operational parameters may include whether to enable/disable carrier aggregation and/or what transmission frequency to use after carrier aggregation is disabled. Additionally, in some embodiments, the association may be stored in one or more carrier aggregation operational parameter LUTs 66.

Moreover, an operational parameter set (e.g., location of protected frequencies) may be associated with channel configuration operational parameters that facilitate compliance with operational constraints. In some embodiments, the channel configuration operational parameters may include channel bandwidth restrictions and/or output power restrictions. Additionally, in some embodiments, the association may be stored in one or more channel configuration operational parameter LUTs 68. Thus, during operation, the radio frequency system 12 may determine operational parameters to implement, which facilitate compliance with operational constraints (e.g., wireless transmission regulations), using the calibration data 56.

Accordingly, the technical effects of the present disclosure include facilitating compliance with wireless transmission regulations while improving performance of a radio frequency system. In some embodiments, the radio frequency system may determine operational constraints, for example based on region of operation, even when a correct network signaling value is not received. Based on the operational constraints, the radio frequency system may determine an override network signaling value when not expected to operate in compliance with the operational constraints. The radio frequency system may then operate based on the override network signaling value instead of a received network signaling value to facilitate compliance with the operational constraints. For example, the radio frequency system may determine and implement operational parameters based at least in part on the override network signaling value. In this manner, the radio frequency system may reduce unnecessary adjustments to operational parameters, thereby improving performance of the radio frequency system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
    an antenna configured to wirelessly transmit a first analog electrical signal from the electronic device; and
    a controller configured to, when the electronic device is instructed to operate in accordance with a first network signaling value associated with a maximum output power of the electronic device:
        determine a first region in which the electronic device is expected to wirelessly transmit the first analog electrical signal;
        determine first operational constraints on wireless transmissions from the electronic device based at least in part on the first region;
        instruct the electronic device to wirelessly transmit the first analog electrical signal using a first reduced output power determined based at least in part on the first operational constraints when overriding of the first network signaling value is enabled; and
        instruct the electronic device to wirelessly transmit the first analog electrical signal using first power amplifier operational parameters determined based at least in part on the first reduced output power, first filter operational parameters determined based at least in part on the first reduced output power, or any combination thereof when overriding of the first network signaling value is not enabled.

2. The electronic device of claim 1, wherein:
    the electronic device is configured to receive the first network signaling value associated with the maximum output power of the electronic device from wireless service provider; and
    when the electronic device is instructed to operate in accordance with the first network signaling value, the controller is configured to:
        determine a second network signaling value different from the first network signaling value based at least in part on the first operational constraints associated with the first region;
        determine an output power reduction value associated with the second network signaling value;
        determine the first reduced output power by applying the output power reduction value to the maximum output power of the electronic device when overriding of the first network signaling value is enabled; and
        determine the first power amplifier operational parameters associated with the output power reduction value, the first filter operational parameters associated with the output power reduction value, or any combination thereof when overriding of the first network signaling value is not enabled.

3. The electronic device of claim 1, wherein the controller is configured to:
determine the first region in which the electronic device is expected to wirelessly transmit the first analog electrical signal based at least in part on a location indication received from a global positioning system; and
determine the first operational constraints based at least in part on the location indication, wherein the first operational constraints comprise protected transmission frequencies within the first region and spurious emission limits associated with the protected transmission frequencies within the first region.

4. The electronic device of claim 1, comprising:
a power supply communicatively coupled to the controller; and
a power amplifier electrically coupled to the power supply, wherein the power amplifier is configured to facilitate generating the first analog electrical signal by amplifying an input signal based at least in part on a supply voltage received from the power supply;
wherein the controller is configured to:
determine target voltage of the supply voltage based at least in part on voltage of the input signal to the power amplifier when difference between the first reduced output power and the maximum output power is less than a threshold and based at least in part on average output power when the difference between the first reduced output power and the maximum output power is not less than the threshold; and
instruct the electronic device to wirelessly transmit the first analog electrical signal using the first power amplifier operational parameters by instructing the power supply to provide the supply voltage with the target voltage to the power amplifier.

5. The electronic device of claim 1, comprising a filter communicatively coupled to the controller, wherein the filter is configured to facilitate generating the first analog electrical signal by filtering an input signal;
wherein the controller is configured to:
determine target filter strength based at least in part on difference between the first reduced output power and the maximum output power the electronic device; and
instruct the electronic device to wirelessly transmit the first analog electrical signal using the first filter operational parameters by instructing the filter to filter the input signal using the target filter strength.

6. The electronic device of claim 1, wherein:
the antenna is configured to wirelessly transmit a second analog electrical signal from the electronic device; and
the controller configured to, when the electronic device is instructed to operate in accordance with the first network signaling value associated with the maximum output power of the electronic device:
determine a second region in which the electronic device is expected to wirelessly transmit the second analog electrical signal;
determine second operational constraints on wireless transmissions from the electronic device based at least in part on the second region, wherein the second operational constraints are different from the first operational constraints when the second region is different from the first region;
instruct the electronic device to wirelessly transmit the second analog electrical signal using a second reduced output power determined based at least in part on the second operational constraints when overriding of the first network signaling value is enabled; and
instruct the electronic device to wirelessly transmit the second analog electrical signal using second power amplifier operational parameters determined based at least in part on the second reduced output power, second filter operational parameters determined based at least in part on the second reduced output power, or any combination thereof when overriding of the first network signaling value is not enabled.

7. The electronic device of claim 1, wherein the electronic device comprises a portable phone, a media player, a personal data organizer, a handheld game platform, a tablet device, a computer, or any combination thereof.

8. A method for implementing a radio frequency system to wirelessly transmit analog electrical signals, comprising:
determining, using processing circuitry, a first output power reduction value associated with a network signaling value when wirelessly transmitting a first analog electrical signal at an output power associated with a received network signaling value is not expected to meet a spurious emissions limit;
instructing, using the processing circuitry, the radio frequency system to wirelessly transmit the first analog electrical signal at a first reduced output power determined based at least in part on the first output power reduction value when overriding of the received network signaling value is enabled; and
when overriding of the received network signaling value is not enabled:
determining, using the processing circuitry, first power amplifier operational parameters associated with the first output power reduction value, first filter operational parameters associated with the first output power reduction value, or both; and
instructing, using the processing circuitry, the radio frequency system to wirelessly transmit the first analog electrical signal by operating a power amplifier using the first power amplifier operational parameters, a filter using the first filter operational parameters, or both.

9. The method of claim 8, comprising determining, using the processing circuitry, that transmitting the first analog electrical signal at the output power associated with the received network signaling value is not expected to meet the spurious emissions limit when the output power associated with the received network signaling value is a maximum output power of the radio frequency system.

10. The method of claim 8, comprising determining, using the processing circuitry, the first reduced output power by applying the first output power reduction value associated with the network signaling value to the output power associated with the received network signaling value;
wherein instructing the radio frequency system to wirelessly transmit the first analog electrical signal at the first reduced output power comprises instructing a power supply electrically coupled to the power amplifier to provide a supply voltage to the power amplifier based at least in part on the first reduced output power.

11. The method of claim 8, comprising instructing, using the processing circuitry, the radio frequency system to wirelessly transmit the first analog electrical signal at the output power associated with the received network signaling value when wirelessly transmitting the first analog electrical signal at the output power associated with the received network signaling value is expected to meet the spurious emissions limit, wherein:
  instructing the radio frequency system to wirelessly transmit the first analog electrical signal at the output power associated with the received network signaling value comprises instructing a power supply electrically coupled to the power amplifier to provide a first supply voltage to the power amplifier; and
  instructing the radio frequency system to wirelessly transmit the first analog electrical signal at the first reduced output power comprises instructing the power supply to provide a second supply voltage less than the first supply voltage to the power amplifier.

12. The method of claim 8, wherein:
determining the first power amplifier operational parameters comprises:
  determining target supply voltage provided from a power supply to the power amplifier based at least in part on voltage of an input signal to the power amplifier when the first output power reduction value is less than a threshold; and
  determining the target supply voltage provided from the power supply to the power amplifier based at least in part on average output power when the first output power reduction value is not less than the threshold; and
instructing, using the processing circuitry, the radio frequency system to wirelessly transmit the first analog electrical signal by operating the power amplifier using the first power amplifier operational parameters comprises instructing the power supply to provide the target supply voltage to the power amplifier while the input signal is input to the power amplifier.

13. The method of claim 8, wherein:
determining the first filter operational parameters comprises:
  determining a target frequency to be filtered based at least in part on a protected frequency associated with the spurious emissions limit; and
  determining a target filter strength based at least in part on amount the first analog electrical signal is expected to exceed the spurious emissions limit at the target frequency; and
instructing, using the processing circuitry, the radio frequency system to wirelessly transmit the first analog electrical signal by operating the filter using the first filter operational parameters comprises instructing the filter apply the target filter strength on an input signal to the filter at the target frequency.

14. The method of claim 8, comprising:
determining, using the processing circuitry, a second output power reduction value associated with the network signaling value different from the first output power reduction value when wirelessly transmitting a second analog electrical signal at the output power associated with the received network signaling value is not expected to meet the spurious emissions limit;
instructing, using the processing circuitry, the radio frequency system to wirelessly transmit the second analog electrical signal at a second reduced output power determined based at least in part on the second output power reduction value when overriding of the received network signaling value is enabled; and
when overriding of the received network signaling value is not enabled:
  determining, using the processing circuitry, second power amplifier operational parameters associated with the second output power reduction value, second filter operational parameters associated with the second output power reduction value, or both; and
  instructing, using the processing circuitry, the radio frequency system to wirelessly transmit the second analog electrical signal by operating the power amplifier using the second power amplifier operational parameters, the filter using the second filter operational parameters, or both.

15. The method of claim 14, comprising:
associating, using the processing circuitry, the first output power reduction value with the network signaling value and a first transmission frequency configuration in an output power reduction look-up-table, wherein the first analog electrical signal is to be wireless transmitted using the first transmission frequency configuration;
associating, using the processing circuitry, the second output power reduction value with the network signaling value and a second transmission frequency configuration in the output power reduction look-up-table, wherein the second analog electrical signal is to be wireless transmitted using the second transmission frequency configuration;
associating, using the processing circuitry, the first power amplifier operational parameters with the first output power reduction value and the second power amplifier operational parameters with the second output power reduction value in a power amplifier operational parameter look-up-table; and
associating, using the processing circuitry, the first filter operational parameters with the first output power reduction value and the second filter operational parameters with the second output power reduction value in a filter operational parameter look-up-table.

16. A tangible, non-transitory, computer-readable medium that stores instructions executable by one or more processors of an electronic device, wherein the instructions comprise instructions to:
  associate, using the one or more processors, a first output power reduction value with a first network signaling value to enable a radio frequency system to wirelessly transmit analog electrical signals using a first reduced output power determined based at least in part on the first output power reduction value when:
    transmission at a maximum output power of the radio frequency system is not expected to meet a spurious emissions limit at a protected transmission frequency; and
    overriding of received network signaling values is enabled; and
  associate, using the one or more processors, the first output power reduction value with first power amplifier operational parameters to enable the radio frequency system to adjust operation of a power amplifier based at least in part on the first power amplifier operational parameters when overriding of received network signaling values is disabled; and
  associate, using the one or more processors, the first output power reduction value with first filter operational parameters to enable the radio frequency system to adjust operation of one or more filters based at least in part on the first filter operational parameters when overriding of received network signaling values is disabled.

17. The tangible, non-transitory, computer-readable medium of claim 16, comprising instructions to:
    associate, using the one or more processors, a second output power reduction value different from the first output power reduction value with the first network signaling value to enable the radio frequency system to wirelessly transmit analog electrical signals using a second reduced output power determined based at least in part on the second output power reduction value when:
        transmission at the maximum output power of the radio frequency system is not expected to meet the spurious emissions limit at the protected transmission frequency; and
        overriding of received network signaling values is enabled; and
    instruct, using the one or more processors, the electronic device to store an output power reduction look-up-table in the radio frequency system, wherein the output power reduction look-up-table:
        indicates association of the first output power reduction value with the first network signaling value and a first transmission frequency configuration; and
        indicates association of the second output power reduction value with the first network signaling value and a second transmission frequency configuration different from the first transmission frequency configuration.

18. The tangible, non-transitory, computer-readable medium of claim 16, comprising instructions to associate, using the one or more processors, the first output power reduction value with a second network signaling value different from the first network signaling value to enable the radio frequency system to wirelessly transmit analog electrical signals using the first reduced output power when:
    transmission at the maximum output power of the radio frequency system is not expected to meet the spurious emissions limit at the protected transmission frequency; and
    overriding of received network signaling values is enabled.

19. The tangible, non-transitory, computer-readable medium of claim 16, comprising instructions to:
    associate, using the one or more processors, the first output power reduction value with second power amplifier operational parameters to enable the radio frequency system to adjust operation of the power amplifier based at least in part on the second power amplifier operational parameters when overriding of received network signaling values is disabled; and
    instruct, using the one or more processors, the electronic device to store a power amplifier operational parameter look-up-table in the radio frequency system, wherein the power amplifier operational parameter look-up-table:
        indicates association of the first power amplifier operational parameters with the first output power reduction value and a first proximity of transmission frequencies relative to the protected transmission frequency; and
        indicates association of the second power amplifier operational parameters with the first output power reduction value and a second proximity of transmission frequencies relative to the protected transmission frequency.

20. The tangible, non-transitory, computer-readable medium of claim 16, comprising instructions to:
    associate, using the one or more processors, the first output power reduction value with second filter operational parameters to enable the radio frequency system to adjust operation of the one or more filters based at least in part on the second filter operational parameters when overriding of received network signaling values is disabled; and
    instruct, using the one or more processors, the electronic device to store a filter operational parameter look-up-table in the radio frequency system, wherein the filter operational parameter look-up-table:
        indicates association of the first filter operational parameters with the first output power reduction value and a first location of transmission frequencies relative to the protected transmission frequency; and
        indicates association of the second filter operational parameters with the first output power reduction value and a second location of transmission frequencies relative to the protected transmission frequency.

* * * * *